United States Patent
Krol et al.

(10) Patent No.: US 11,741,652 B1
(45) Date of Patent: Aug. 29, 2023

(54) VOLUMETRIC AVATAR RENDERING

(71) Applicant: Katmai Tech Inc., New York, NY (US)

(72) Inventors: Gerard Cornelis Krol, Leiden (NL); Petr Polyakov, Tampa, FL (US)

(73) Assignee: Katmai Tech Inc., New York, NY (US)

( * ) Notice: Subject to any disclaimer, the term of this patent is extended or adjusted under 35 U.S.C. 154(b) by 0 days.

(21) Appl. No.: 17/931,804

(22) Filed: Sep. 13, 2022

(51) Int. Cl.
*G06T 13/40* (2011.01)
*G06T 19/20* (2011.01)

(52) U.S. Cl.
CPC .............. *G06T 13/40* (2013.01); *G06T 19/20* (2013.01)

(58) Field of Classification Search
CPC ................................ G06T 13/40; G06T 19/20
See application file for complete search history.

(56) References Cited

U.S. PATENT DOCUMENTS

| | | | | |
|---|---|---|---|---|
| 11,463,499 B1 * | 10/2022 | Fieldman | ................. | H04L 65/65 |
| 2022/0198731 A1 * | 6/2022 | Lombardi | ................. | G06T 7/73 |

OTHER PUBLICATIONS

Kreskowski et al., "Output-Sensitive Avatar Representations for Immersive Telepresence," IEEE Transactions on Visualization and Computer Graphics, vol. 28, No. 7, Jul. 2022. (Year: 2022).*
Cho et al., "Effects of volumetric capture avatars on social presence in immersive virtual environments," 2020 IEEE Conference on Virtual Reality and 3D User Interfaces (VR), p. 26-34. (Year: 2020).*
Prince et al., "3D Live: Real Time Captured Content for Mixed Reality," Proceedings of the International Symposium on Mixed and Augmented Reality 2002 (ISMAR'02). (Year: 2002).*

* cited by examiner

*Primary Examiner* — Sing-Wai Wu
(74) *Attorney, Agent, or Firm* — Sterne, Kessler, Goldstein & Fox P.L.L.C.

(57) ABSTRACT

Disclosed herein are aspects for altering avatar backgrounds and rendering volumetric avatars in a three-dimensional virtual environment. An aspect begins by receiving, from a first device of a first user, configuration settings specifying how a background of a first user's avatar is to be presented to a second user in the 3D virtual environment. The aspect continues by capturing a video stream of the first user and altering portions of the video stream. The configuration settings and the video stream with the altered background are used to render the first user's avatar. Another aspect begins by receiving configuration settings and a video stream with a background. The aspect continues by rendering a front surface, back surface, and side surface of an avatar based on the configuration settings and video stream.

20 Claims, 21 Drawing Sheets

VOLUMETRIC AVATAR RENDERING

BACKGROUND

Technical Field

Aspects of the present disclosure relate to components, systems, and methods for altering avatar backgrounds and rendering volumetric avatars in a three-dimensional virtual environment.

Related Art

Video conferencing involves the reception and transmission of audio-video signals by users at different locations for communication between people in real time. Videoconferencing is widely available on many computing devices from a variety of different services, including the ZOOM service available from Zoom Communications Inc. of San Jose, Calif. Some videoconferencing software, such as the FaceTime application available from Apple Inc. of Cupertino, Calif., comes standard with mobile devices.

In general, these applications operate by displaying video and outputting audio of other conference participants. When there are multiple participants, the screen may be divided into a number of rectangular frames, each displaying video of a participant. Sometimes these services operate by having a larger frame that presents video of the person speaking. As different individuals speak, that frame will switch between speakers. The application captures video from a camera integrated with the user's device and audio from a microphone integrated with the user's device. The application then transmits that audio and video to other applications running on other user devices.

Many of these videoconferencing applications have a screen share functionality. When a user decides to share their screen (or a portion of their screen), a stream is transmitted to the other users' devices with the contents of their screen. In some cases, other users can even control what is on the user's screen. In this way, users can collaborate on a project or make a presentation to the other meeting participants.

Recently, videoconferencing technology has gained importance. Especially since the COVID-19 pandemic, many workplaces, trade shows, meetings, conferences, schools, and places of worship are now taking place at least partially online. Virtual conferences using videoconferencing technology are increasingly replacing physical conferences. In addition, this technology provides advantages over physically meeting to avoid travel and commuting.

However, often, use of this videoconferencing technology causes loss of a sense of place. There is an experiential aspect to meeting in person physically, being in the same place, that is lost when conferences are conducted virtually. There is a social aspect to being able to posture yourself and look at your peers. This feeling of experience is important in creating relationships and social connections. Yet, this feeling is lacking when it comes to conventional videoconferences.

Moreover, when the conference starts to get several participants, additional problems occur with these videoconferencing technologies. Where with physical meeting conferences people are able to gather in an area or a conference room to effectively interact with one another, virtual conferences often limit the ability to see or hear all participants. Even when all participants can be seen or heard in the virtual world, there may be a problem finding natural spacing or ordering amongst the participants.

Further in physical meeting conferences, people can have side interactions. You can project your voice so that only people close to you can hear what you're saying. In some cases, you can even have private conversations in the context of a larger meeting. However, with virtual conferences, when multiple people are speaking at the same time, the software mixes the two audio streams substantially equally, causing the participants to speak over one another. Thus, when multiple people are involved in a virtual conference, private conversations are impossible, and the dialogue tends to be more in the form of speeches from one to many. Here, too, virtual conferences lose an opportunity for participants to create social connections and to communicate and network more effectively.

Massively multiplayer online games (MMOG or MMO) generally can handle quite a few more than 25 participants. These games often have hundreds or thousands of players. MMOs often allow players to navigate avatars around a virtual world. Sometimes these MMOs allow users to speak with one another or send messages to one another. Examples include the ROBLOX game available from Roblox Corporation of San Mateo, Calif., and the MINECRAFT game available from Mojang Studios of Stockholm, Sweden.

Having bare avatars interact with one another also has limitations in terms of social interaction. These avatars usually cannot communicate facial expressions, which people often make inadvertently. These facial expressions are observable in videoconferences.

Some publications may describe having video placed on an avatar in a virtual world. Placing video on an avatar in a three-dimensional virtual environment may be have limitations. In a first limitation, known systems to provide video avatars typically require specialized software.

In a second limitation, the video may capture background images in the user's surrounding. In other words, a user may be viewing a virtual office space with a video avatar representing another user, and the video on the avatar illustrates the other user's real world physical surroundings. Showing real world physical surroundings in this way hinders privacy.

In a third limitation, video avatars in prior art systems may typically lack depth. The video is texture mapped onto a thin plane. Thus, when viewing an avatar from the side, the avatar may appear slight or may disappear entirely.

Improved methods are needed for videoconferencing.

SUMMARY

In an aspect, a computer-implemented method provides for rendering a volumetric avatar in a three-dimensional virtual environment. The method begins by receiving configuration settings and a video stream with a background on a first device of a first user. The configuration settings and the video stream are sent from a second device of a second user, and the video stream captures the second user. Then, from a perspective of a virtual camera in the 3D virtual environment corresponding to the first user, the method continues with several operations. The method continues by rendering a front surface of an avatar containing the video stream. The rendered front surface excludes the background. The method continues by rendering a back surface of the avatar containing a silhouette corresponding to the video stream. The rendered back surface excludes the video stream and the background. The method concludes by rendering a side surface of the avatar.

System, device, and computer program product aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

In the drawings, like reference numbers generally indicate identical or similar elements. Additionally, generally, the left-most digit(s) of a reference number identifies the drawing in which the reference number first appears.

Aspects of the present disclosure will be described with reference to the accompanying drawings.

DETAILED DESCRIPTION

Video Conference With Avatars in a Virtual Environment

Figure 1:
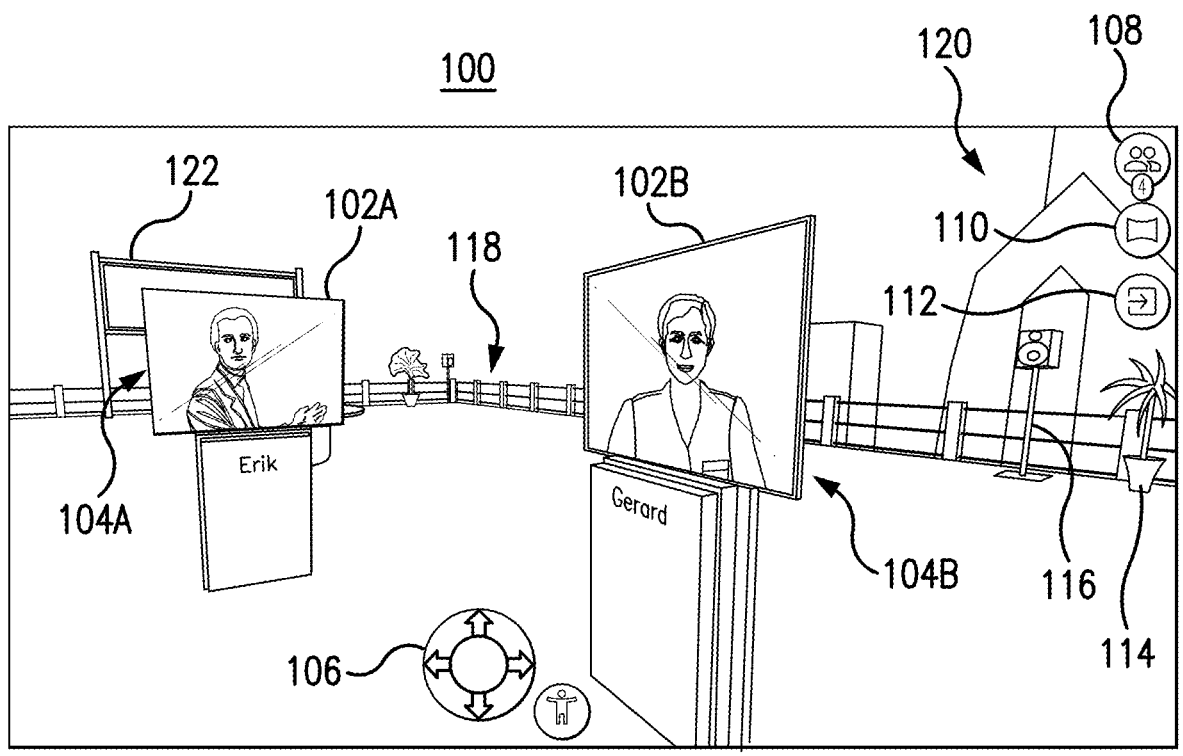
FIG. 1 is a diagram illustrating an example interface that provides videoconferencing in a virtual environment with video streams being mapped onto avatars.

FIG. 1 is a diagram illustrating an example of an interface 100 that provides videoconferences in a virtual environment with video streams being mapped onto avatars.

Interface 100 may be displayed to a participant to a videoconference. For example, interface 100 may be rendered for display to the participant and may be constantly updated as the videoconference progresses. A user may control the orientation of their virtual camera using, for example, keyboard inputs. In this way, the user can navigate around a virtual environment. In an aspect, different inputs may change the virtual camera's X and Y position and pan and tilt angles in the virtual environment. In further aspects, a user may use inputs to alter height (the Z coordinate) or yaw of the virtual camera. In still further aspects, a user may enter inputs to cause the virtual camera to "hop" up while returning to its original position, simulating gravity. The inputs available to navigate the virtual camera may include, for example, keyboard and mouse inputs, such as WASD keyboard keys to move the virtual camera forward, backward, left, or right on an X-Y plane, a space bar key to "hop" the virtual camera, and mouse movements specifying changes in pan and tilt angles.

Interface 100 includes avatars 102A and B, which each represent different participants to the videoconference. Avatars 102A and B, respectively, have texture mapped video streams 104A and B from devices of the first and second participant. A texture map is an image applied (mapped) to the surface of a shape or polygon. Here, the images are respective frames of the video. The camera devices capturing video streams 104A and B are positioned to capture faces of the respective participants. In this way, the avatars have texture mapped thereon, moving images of faces as participants in the meeting talk and listen.

Similar to how the virtual camera is controlled by the user viewing interface 100, the location and direction of avatars 102A and B are controlled by the respective participants that they represent. Avatars 102A and B are three-dimensional models represented by a mesh. Each avatar 102A and B may have the participant's name underneath the avatar.

The respective avatars 102A and B are controlled by the various users. They each may be positioned at a point corresponding to where their own virtual cameras are located within the virtual environment. Just as the user viewing interface 100 can move around the virtual camera, the various users can move around their respective avatars 102A and B.

The virtual environment rendered in interface 100 includes background image 120 and a three-dimensional model 118 of an arena. The arena may be a venue or building in which the videoconference should take place. The arena may include a floor area bounded by walls. Three-dimensional model 118 can include a mesh and texture. Other ways to mathematically represent the surface of three-dimensional model 118 may be possible as well. For example, polygon modeling, curve modeling, and digital sculpting may be possible. For example, three-dimensional model 118 may be represented by voxels, splines, geometric primitives, polygons, or any other possible representation in three-dimensional space. Three-dimensional model 118 may also include specification of light sources. The light sources can include for example, point, directional, spotlight, and ambient. The objects may also have certain properties describing how they reflect light. In examples, the properties may include diffuse, ambient, and spectral lighting interactions.

In addition to the arena, the virtual environment can include various other three-dimensional models that illustrate different components of the environment. For example, the three-dimensional environment can include a decorative model 114, a speaker model 116, and a presentation screen model 122. Just as with model 118, these models can be represented using any mathematical way to represent a geometric surface in three-dimensional space. These models may be separate from model 118 or combined into a single representation of the virtual environment.

Decorative models, such as model 114, serve to enhance the realism and increase the aesthetic appeal of the arena. Speaker model 116 may virtually emit sound, such as presentation and background music. Presentation screen model 122 can serve to provide an outlet to present a presentation. Video of the presenter or a presentation screen share may be texture mapped onto presentation screen model 122.

Button 108 may provide the user with a list of participants. In one example, after a user selects button 108, the user can chat with other participants by sending text messages, individually or as a group.

Button 110 may enable a user to change attributes of the virtual camera used to render interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60 and 110°, which is commensurate with a wide-angle lens and human vision. However, selecting button 110 may cause the virtual camera to increase the field of view to exceed 170°, commensurate with a fisheye lens. This may enable a user to have broader peripheral awareness of their surroundings in the virtual environment.

Finally, button 112 causes the user to exit the virtual environment. Selecting button 112 may cause a notification to be sent to devices belonging to the other participants signaling to their devices to stop displaying the avatar corresponding to the user previously viewing interface 100.

In this way, interface virtual 3D space is used to conduct video conferencing. Every user controls an avatar, which they can control to move around, look around, jump or do other things which change the position or orientation. A virtual camera shows the user the virtual 3D environment and the other avatars. The avatars of the other users have as an integral part a virtual display, which shows the webcam image of the user.

By giving users a sense of space and allowing users to see each other's faces, aspects provide a more social experience than conventional web conferencing or conventional MMO gaming. That more social experience has a variety of applications. For example, it can be used in online shopping. For example, interface 100 has applications in providing virtual grocery stores, houses of worship, trade shows, B2B sales, B2C sales, schooling, restaurants or lunchrooms, product releases, construction site visits (e.g., for architects, engineers, contractors), office spaces (e.g., people work "at their desks" virtually), controlling machinery remotely (ships, vehicles, planes, submarines, drones, drilling equipment, etc.), plant/factory control rooms, medical procedures, garden designs, virtual bus tours with guide, music events (e.g., concerts), lectures (e.g., TED talks), meetings of political parties, board meetings, underwater research, research on hard to reach places, training for emergencies (e.g., fire), cooking, shopping (with checkout and delivery), virtual arts and crafts (e.g., painting and pottery), marriages, funerals, baptisms, remote sports training, counseling, treating fears (e.g., confrontation therapy), fashion shows, amusement parks, home decoration, watching sports, watching esports, watching performances captured using a three-dimensional camera, playing board and role playing games, walking over/through medical imagery, viewing geological data, learning languages, meeting in a space for the visually impaired, meeting in a space for the hearing impaired, participation in events by people who normally can't walk or stand up, presenting the news or weather, talk shows, book signings, voting, MMOs, buying/selling virtual locations (such as those available in some MMOs like the SECOND LIFE game available from Linden Research, Inc. of San Francisco, Calif.), flea markets, garage sales, travel agencies, banks, archives, computer process management, fencing/sword fighting/martial arts, reenactments (e.g., reenacting a crime scene and or accident), rehearsing a real event (e.g., a wedding, presentation, show, space-walk), evaluating or viewing a real event captured with three-dimensional cameras, livestock shows, zoos, experiencing life as a tall/short/blind/deaf/white/black person (e.g., a modified video stream or still image for the virtual world to simulate the perspective when a user wishes to experience the reactions), job interviews, game shows, interactive fiction (e.g., murder mystery), virtual fishing, virtual sailing, psychological research, behavioral analysis, virtual sports (e.g., climbing/bouldering), controlling the lights etc. in your house or other location (domotics), memory palace, archaeology, gift shop, virtual visit so customers will be more comfortable on their real visit, virtual medical procedures to explain the procedures and have people feel more comfortable, and virtual trading floor/financial marketplace/stock market (e.g., integrating real-time data and video feeds into the virtual world, real-time transactions and analytics), virtual location people have to go to as part of their work so they will actually meet each other organically (e.g., if you want to create an invoice, it is only possible from within the virtual location) and augmented reality where you project the face of the person on top of their AR headset (or helmet) so you can see their facial expressions (e.g., useful for military, law enforcement, firefighters, and special ops), and making reservations (e.g., for a certain holiday, home/car/etc.)

Figure 2:
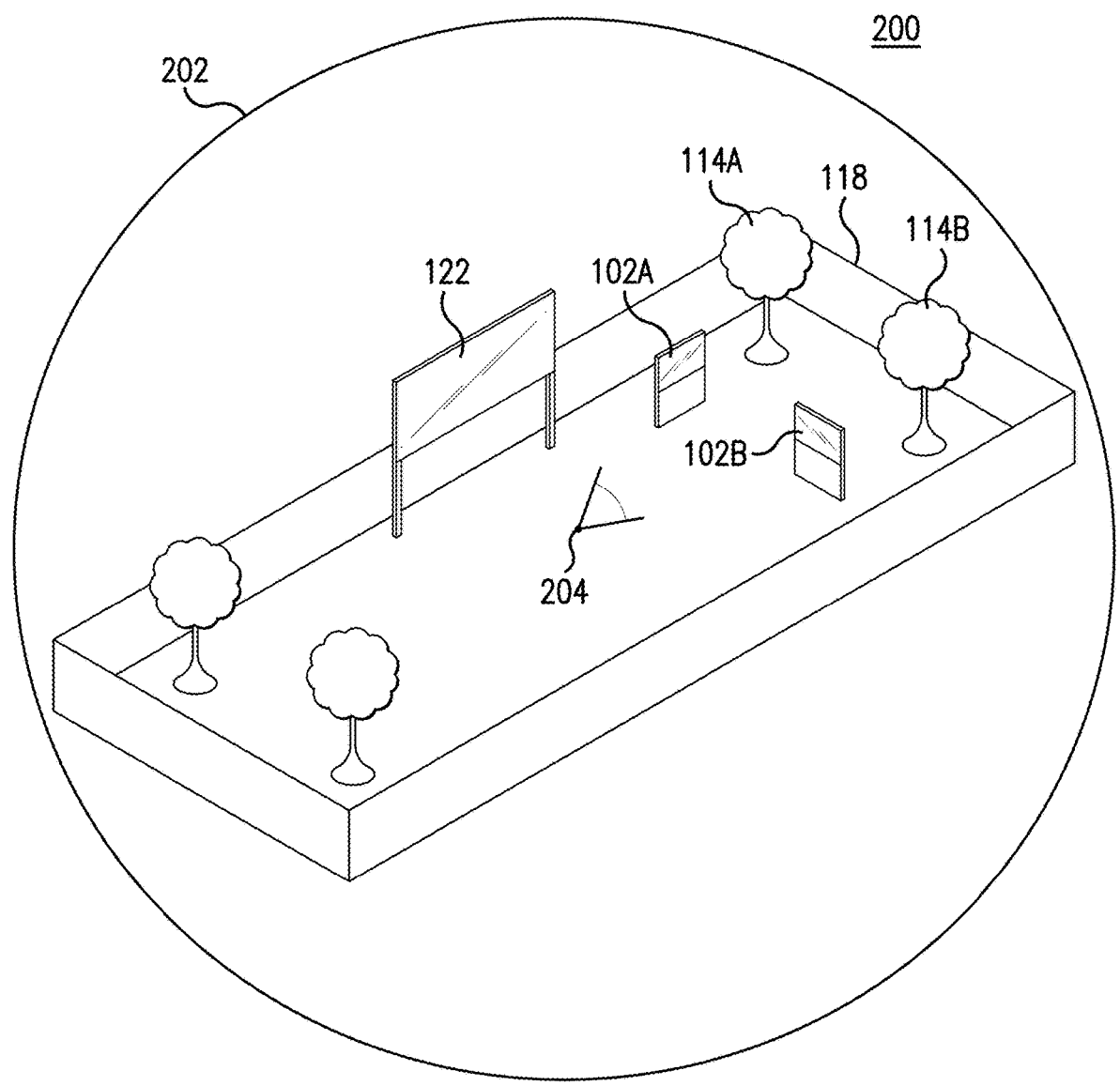
FIG. 2 is a diagram illustrating a three-dimensional model used to render a virtual environment with avatars for videoconferencing.

FIG. 2 is a diagram 200 illustrating a three-dimensional model used to render a virtual environment with avatars for videoconferencing. Just as illustrated in FIG. 1, the virtual environment here includes a three-dimensional arena 118, and various three-dimensional models, including three-dimensional models 114 and 122. Also as illustrated in FIG. 1, diagram 200 includes avatars 102A and B navigating around the virtual environment.

As described above, interface 100 in FIG. 1 is rendered from the perspective of a virtual camera. That virtual camera is illustrated in diagram 200 as virtual camera 204. As mentioned above, the user viewing interface 100 in FIG. 1 can control virtual camera 204 and navigate the virtual camera in three-dimensional space. Interface 100 is constantly being updated according to the new position of virtual camera 204 and any changes of the models within the field of view of virtual camera 204. As described above, the field of view of virtual camera 204 may be a frustum defined, at least in part, by horizontal and vertical field of view angles.

As described above with respect to FIG. 1, a background image, or texture, may define at least part of the virtual environment. The background image may capture aspects of the virtual environment that are meant to appear at a distance. The background image may be texture mapped onto a sphere 202. The virtual camera 204 may be at an origin of the sphere 202. In this way, distant features of the virtual environment may be efficiently rendered.

In other aspects, other shapes instead of sphere 202 may be used to texture map the background image. In various alternative aspects, the shape may be a cylinder, cube, rectangular prism, or any other three-dimensional geometric shape.

Figure 3:
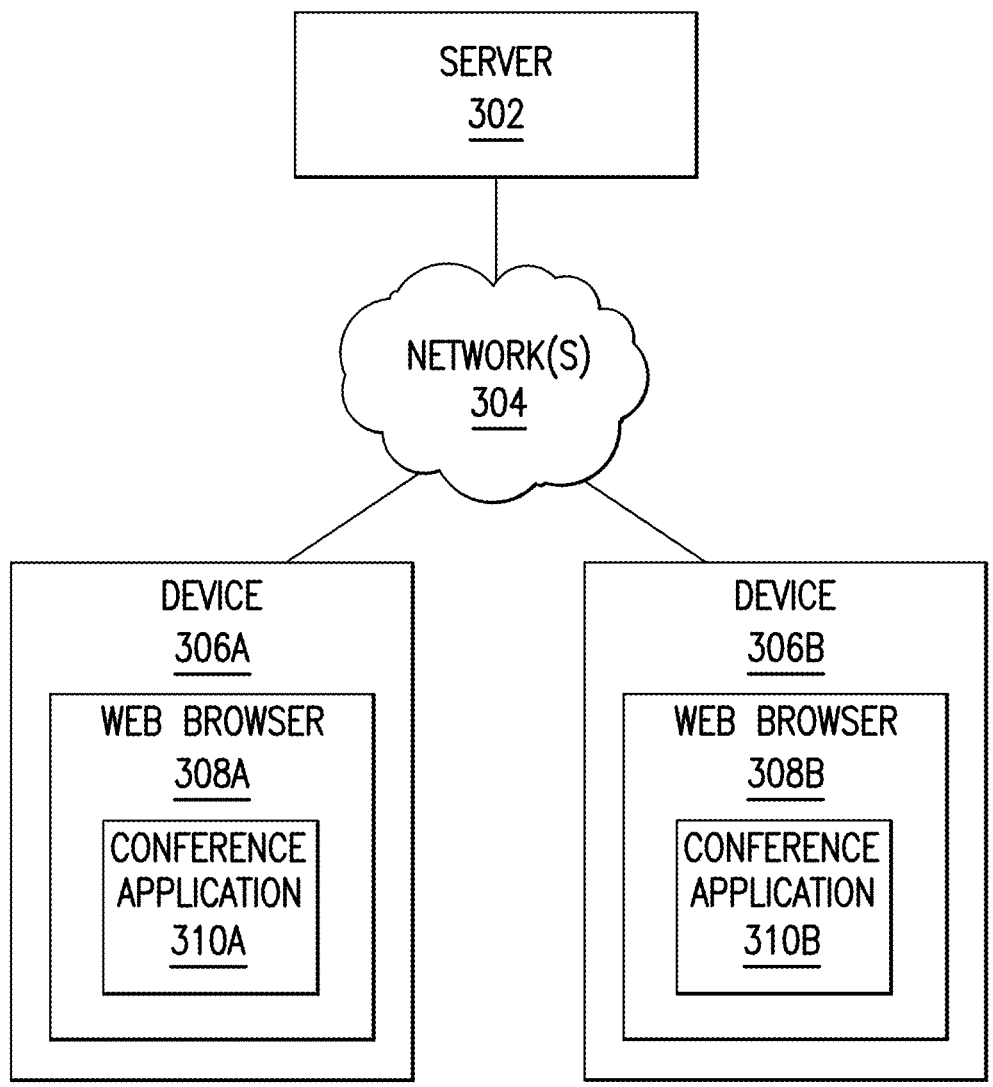
FIG. 3 is a diagram illustrating a system that provides videoconferences in a virtual environment.

FIG. 3 is a diagram illustrating a system 300 that provides videoconferences in a virtual environment. System 300 includes a server 302 coupled to devices 306A and B via one or more networks 304.

Server 302 provides the services to connect a videoconference session between devices 306A and 306B. As will be described in greater detail below, server 302 communicates notifications to devices of conference participants (e.g., devices 306A-B) when new participants join the conference and when existing participants leave the conference. Server 302 communicates messages describing a position and direction in a three-dimensional virtual space for respective participant's virtual cameras within the three-dimensional virtual space. Server 302 also communicates video and audio streams between the respective devices of the participants (e.g., devices 306A-B). Finally, server 302 stores and transmits data describing data specifying a three-dimensional virtual space to the respective devices 306A-B.

In addition to the data necessary for the virtual conference, server 302 may provide executable information that instructs the devices 306A and 306B on how to render the data to provide the interactive conference.

Server 302 responds to requests with a response. Server 302 may be a web server. A web server is software and hardware that uses HTTP (Hypertext Transfer Protocol) and other protocols to respond to client requests made over the World Wide Web. The main job of a web server is to display website content through storing, processing and delivering webpages to users.

In an alternative aspect, communication between devices 306A-B happens not through server 302 but on a peer-to-peer basis. In that aspect, one or more of the data describing the respective participants' location and direction, the notifications regarding new and existing participants, and the video and audio streams of the respective participants are communicated not through server 302 but directly between devices 306A-B.

Network 304 enables communication between the various devices 306A-B and server 302. Network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

Devices 306A-B are each devices of respective participants to the virtual conference. Devices 306A-B each receive data necessary to conduct the virtual conference and render the data necessary to provide the virtual conference. As will be described in greater detail below, devices 306A-B include a display to present the rendered conference information, inputs that allow the user to control the virtual camera, a speaker (such as a headset) to provide audio to the user for the conference, a microphone to capture a user's voice input, and a camera positioned to capture video of the user's face.

Devices 306A-B can be any type of computing device, including a laptop, a desktop, a smartphone, a tablet computer, or a wearable computer (such as a smartwatch or a augmented reality or virtual reality headset).

Web browser 308A-B can retrieve a network resource (such as a webpage) addressed by the link identifier (such as a uniform resource locator, or URL) and present the network resource for display. In particular, web browser 308A-B is a software application for accessing information on the World Wide Web. Usually, web browser 308A-B makes this request using the hypertext transfer protocol (HTTP or HTTPS). When a user requests a web page from a particular website, the web browser retrieves the necessary content from a web server, interprets and executes the content, and then displays the page on a display on device 306A-B shown as client/counterpart conference application 310A-B. In examples, the content may have HTML and client-side scripting, such as JavaScript. Once displayed, a user can input information and make selections on the page, which can cause web browser 308A-B to make further requests.

Conference application 310A-B may be a web application downloaded from server 302 and configured to be executed by the respective web browsers 308A-B. In an aspect, conference application 310A-B may be a JavaScript application. In one example, conference application 310A-B may be written in a higher-level language, such as a Typescript language, and translated or compiled into JavaScript. Conference application 310A-B is configured to interact with the WebGL JavaScript application programming interface. It may have control code specified in JavaScript and shader code written in OpenGL ES Shading Language (GLSL ES). Using the WebGL API, conference application 310A-B may be able to utilize a graphics processing unit (not shown) of device 306A-B. Moreover, OpenGL rendering of interactive two-dimensional and three-dimensional graphics without the use of plug-ins is also possible.

Conference application 310A-B receives the data from server 302 describing position and direction of other avatars and three-dimensional modeling information describing the virtual environment. In addition, conference application 310A-B receives video and audio streams of other conference participants from server 302.

Conference application 310A-B renders three three-dimensional modeling data, including data describing the three-dimensional environment and data representing the respective participant avatars. This rendering may involve rasterization, texture mapping, ray tracing, shading, or other rendering techniques. In an aspect, the rendering may involve ray tracing based on the characteristics of the virtual camera. Ray tracing involves generating an image by tracing a path of light as pixels in an image plane and simulating the effects of encounters with virtual objects. In some aspects, to enhance realism, the ray tracing may simulate optical effects such as reflection, refraction, scattering, and dispersion.

In this way, the user uses web browser 308A-B to enter a virtual space. The scene is displayed on the screen of the user. The webcam video stream and microphone audio stream of the user are sent to server 302. When other users enter the virtual space an avatar model is created for them. The position of this avatar is sent to the server and received by the other users. Other users also get a notification from server 302 that an audio/video stream is available. The video stream of a user is placed on the avatar that was created for that user. The audio stream is played back as coming from the position of the avatar.

Figure 4A:
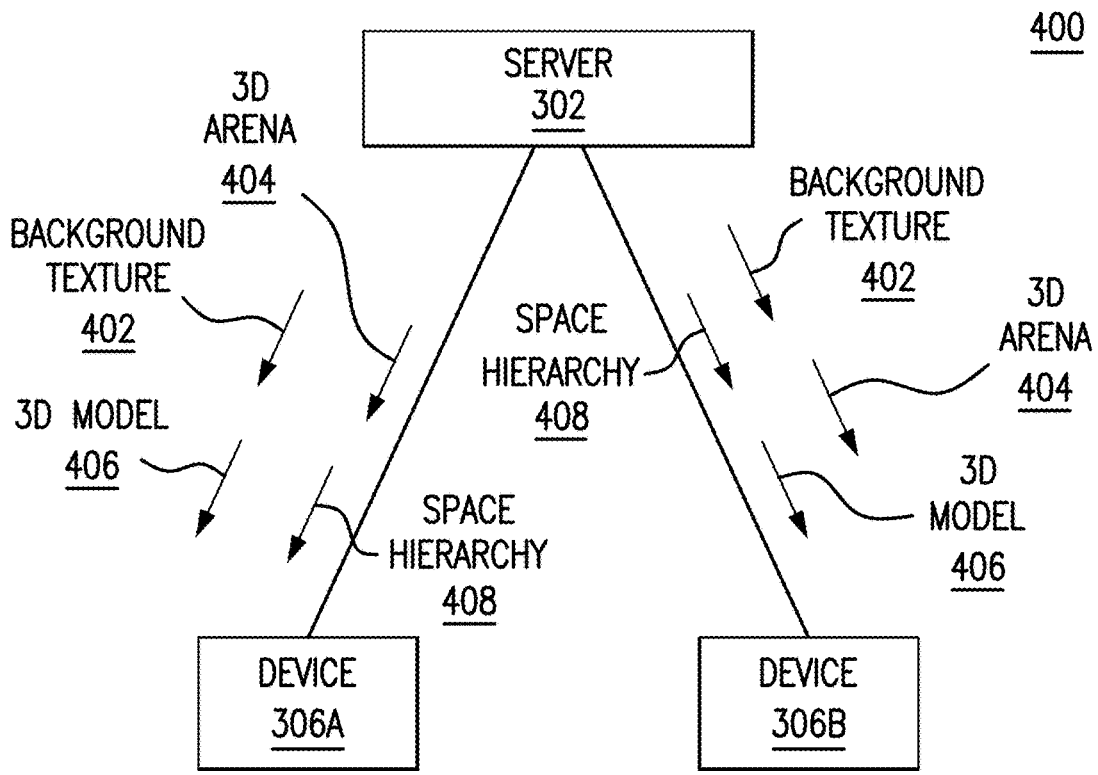
FIGS. 4A-4C illustrate how data is transferred between various components of the system in FIG. 3 to provide videoconferencing.
Figure 4B:
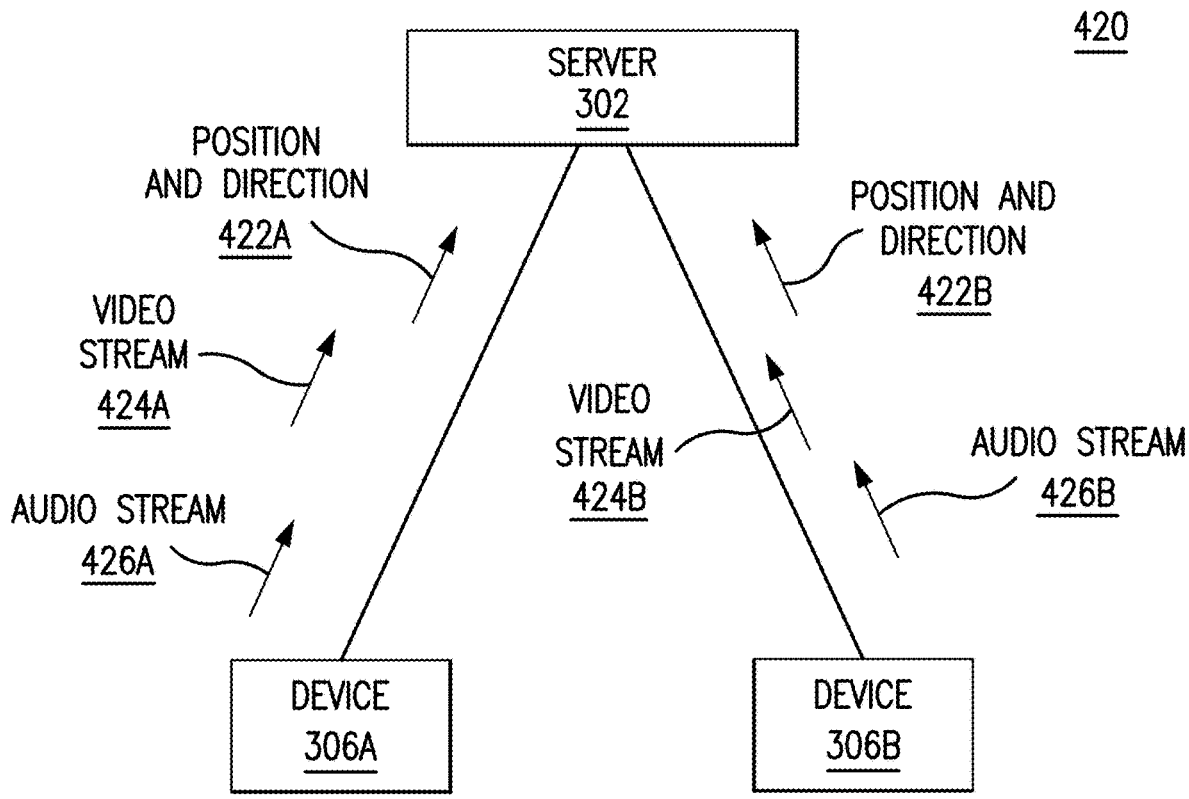
Figure 4C:
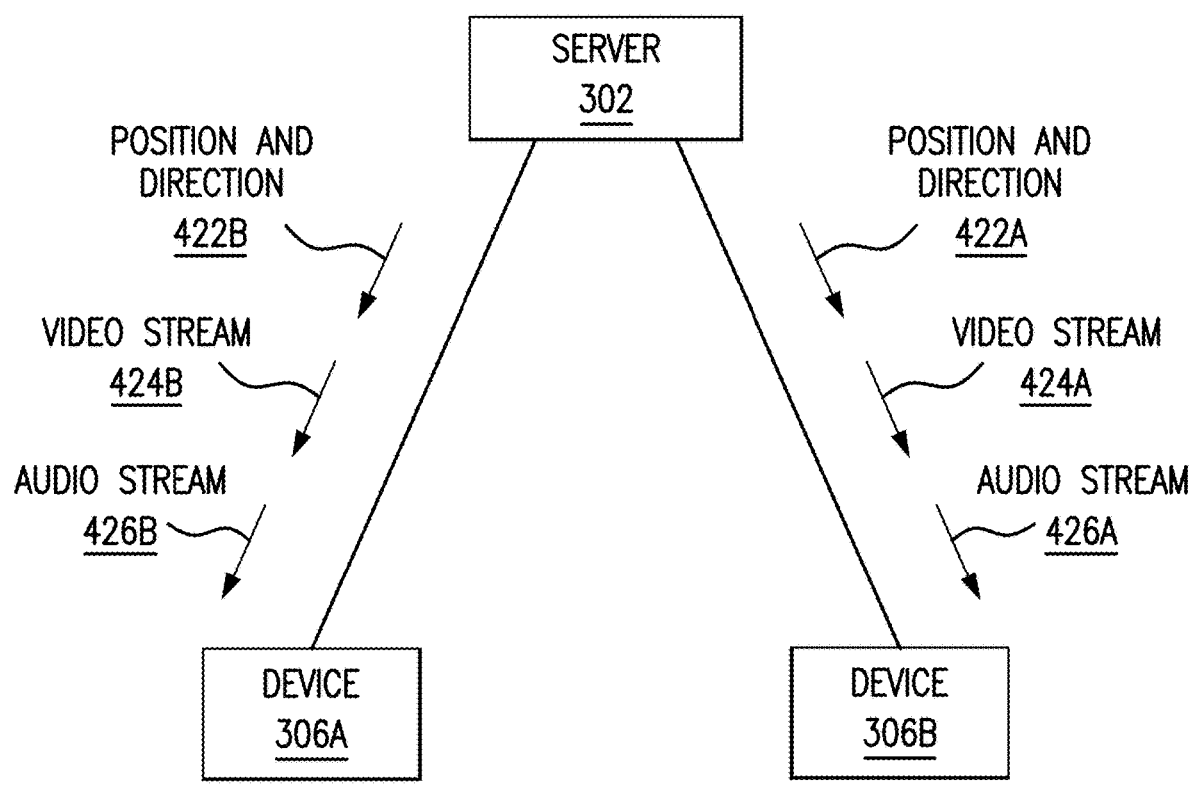

FIGS. 4A-C illustrate how data is transferred between various components of the system in FIG. 3 to provide videoconferencing. Like FIG. 3, each of FIGS. 4A-C depict the connection between server 302 and devices 306A and B. In particular, FIGS. 4A-C illustrate example data flows between those devices.

FIG. 4A illustrates a diagram 400 illustrating how server 302 transmits data describing the virtual environment to devices 306A and B. In particular, both devices 306A and B, receive from server 302 the three-dimensional arena 404, background texture 402, space hierarchy 408 and any other three-dimensional modeling information 406.

As described above, background texture 402 is an image illustrating distant features of the virtual environment. The image may be regular (such as a brick wall) or irregular. Background texture 402 may be encoded in any common image file format, such as bitmap, JPEG, GIF, or other file image format. It describes the background image to be rendered against, for example, a sphere at a distance.

Three-dimensional arena 404 is a three-dimensional model of the space in which the conference is to take place. As described above, it may include, for example, a mesh and possibly its own texture information to be mapped upon the three-dimensional primitives it describes. It may define the space in which the virtual camera and respective avatars can navigate within the virtual environment. Accordingly, it may be bounded by edges (such as walls or fences) that illustrate to users the perimeter of the navigable virtual environment.

Space hierarchy 408 is data specifying partitions in the virtual environment. These partitions are used to determine how sound is processed before being transferred between participants. As will be described below, this partition data may be hierarchical and may describe sound processing to allow for areas where participants to the virtual conference can have private conversations or side conversations.

Three-dimensional model 406 is any other three-dimensional modeling information needed to conduct the conference. In one aspect, this may include information describing the respective avatars. Alternatively or additionally, this information may include product demonstrations.

With the information needed to conduct the meeting sent to the participants, FIGS. 4B-C illustrate how server 302 forwards information from one device to another. FIG. 4B illustrates a diagram 420 showing how server 302 receives information from respective devices 306A and B, and FIG. 4C illustrates a diagram 460 showing how server 302 transmits the information to respective devices 306B and A. In particular, device 306A transmits position and direction 422A, video stream 424A, and audio stream 426A to server 302, which transmits position and direction 422A, video stream 424A, and audio stream 426A to device 306B. And device 306B transmits position and direction 422B, video stream 424B, and audio stream 426B to server 302, which transmits position and direction 422B, video stream 424B, and audio stream 426B to device 306A.

Position and direction 422A-B describe the position and direction of the virtual camera for the user of device 306A. As described above, the position may be a coordinate in three-dimensional space (e.g., x, y, z coordinate) and the direction may be a direction in three-dimensional space (e.g., pan, tilt, roll). In some aspects, the user may be unable to control the virtual camera's roll, so the direction may only specify pan and tilt angles. Similarly, in some aspects, the user may be unable to change the avatar's z coordinate (as the avatar is bounded by virtual gravity), so the z coordinate may be unnecessary. In this way, position and direction 422A-B each may include at least a coordinate on a horizontal plane in the three-dimensional virtual space and a pan and tilt value. Alternatively or additionally, the user may be able to "jump" it's avatar, so the Z position may be specified only by an indication of whether the user is jumping their avatar.

In different examples, position and direction 422A-B may be transmitted and received using HTTP request responses or using socket messaging.

Video stream 424A-B is video data captured from a camera of the respective devices 306A and B. The video may be compressed. For example, the video may use any commonly known video codecs, including MPEG-4, VP8, or H.264. The video may be captured and transmitted in real time.

Similarly, audio stream 426A-B is audio data captured from a microphone of the respective devices. The audio may be compressed. For example, the video may use any commonly known audio codecs, including MPEG-4 or Vorbis. The audio may be captured and transmitted in real time. Video stream 424A and audio stream 426A are captured, transmitted, and presented synchronously with one another. Similarly, video stream 424B and audio stream 426B are captured, transmitted, and presented synchronously with one another.

The video stream 424A-B and audio stream 426A-B may be transmitted using the WebRTC application programming interface. The WebRTC is an API available in JavaScript. As described above, devices 306A and B download and run web applications, as conference applications 310A and B, and conference applications 310A and B may be implemented in JavaScript. Conference applications 310A and B may use WebRTC to receive and transmit video stream 424A-B and audio stream 426A-B by making API calls from its JavaScript.

As mentioned above, when a user leaves the virtual conference, this departure is communicated to all other users. For example, if device 306A exits the virtual conference, server 302 would communicate that departure to device 306B. Consequently, device 306B would stop rendering an avatar corresponding to device 306A, removing the avatar from the virtual space. Additionally, device 306B will stop receiving video stream 424A and audio stream 426A.

As described above, conference applications 310A and B may periodically or intermittently re-render the virtual space based on new information from respective video streams 424A and B, position and direction 422A and B, and new information relating to the three-dimensional environment. For simplicity, each of these updates are now described from the perspective of device 306A. However, a skilled artisan would understand that device 306B would behave similarly given similar changes.

As device 306A receives video stream 424B, device 306A texture maps frames from video stream 424A on to an avatar corresponding to device 306B. That texture mapped avatar is re-rendered within the three-dimensional virtual space and presented to a user of device 306A.

As device 306A receives a new position and direction 422B, device 306A generates the avatar corresponding to device 306B positioned at the new position and oriented at the new direction. The generated avatar is re-rendered within the three-dimensional virtual space and presented to the user of device 306A.

In some aspects, server 302 may send updated model information describing the three-dimensional virtual environment. For example, server 302 may send updated information 402, 404, 406, or 408. When that happens, device 306A will re-render the virtual environment based on the updated information. This may be useful when the environment changes over time. For example, an outdoor event may change from daylight to dusk as the event progresses.

Again, when device 306B exits the virtual conference, server 302 sends a notification to device 306A indicating that device 306B is no longer participating in the conference. In that case, device 306A would re-render the virtual environment without the avatar for device 306B.

While FIG. 3 in FIGS. 4A-4C is illustrated with two devices for simplicity, a skilled artisan would understand that the techniques described herein can be extended to any number of devices. Also, while FIG. 3 in FIGS. 4A-4C illustrates a single server 302, a skilled artisan would understand that the functionality of server 302 can be spread out among a plurality of computing devices. In an aspect, the data transferred in FIG. 4A may come from one network address for server 302, while the data transferred in FIGS. 4B-4C can be transferred to/from another network address for server 302.

In one aspect, participants can set their webcam, microphone, speakers and graphical settings before entering the virtual conference. In an alternative aspect, after starting the application, users may enter a virtual lobby where they are greeted by an avatar controlled by a real person. This person is able to view and modify the webcam, microphone, speakers and graphical settings of the user. The attendant can also instruct the user on how to use the virtual environment, for example by teaching them about looking, moving around and interacting. When they are ready, the user automatically leaves the virtual waiting room and joins the real virtual environment.

Avatar Background Alteration and Volumetric Avatar Rendering

Figure 5:
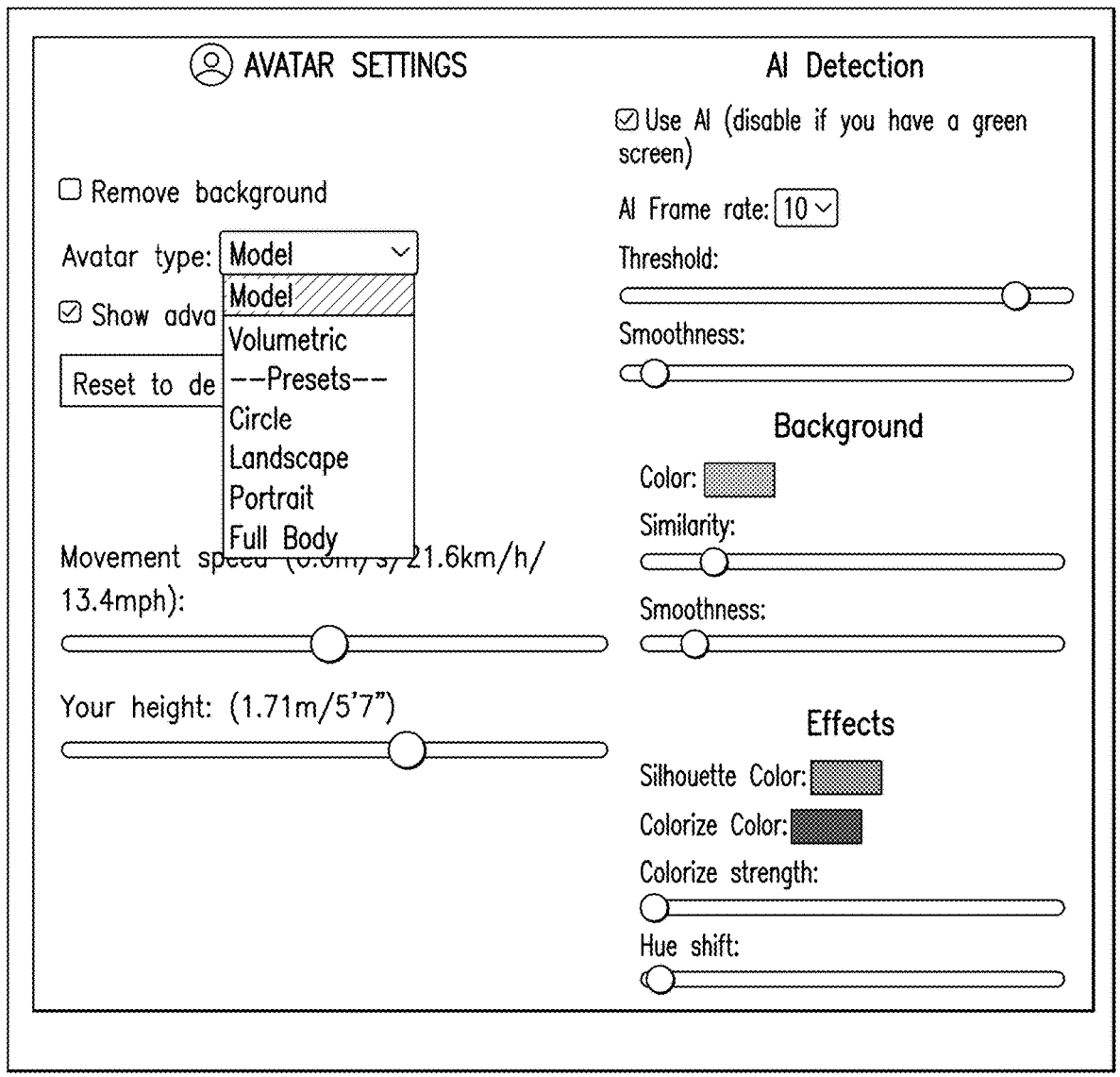
FIG. 5 is an illustration of a user interface when providing configuration settings for avatar background alteration and volumetric avatar rendering.

FIG. 5 is an illustration of a user interface 500 when providing configuration settings for avatar background alteration and volumetric avatar rendering. The configuration settings may for example specify a cutoff shape to crop a video stream for an avatar (e.g., circle, landscape, portrait, full body, and height). In addition, the configuration settings may specify whether the avatar represented by a solid opaque model or has a partially transparent or volumetric appearance as will be described in detail below.

In an embodiment, a configuration setting in user interface 500 may specify that the user desires background to be removed. As discussed above, a user may desire to interact in the three-dimensional (3D) virtual environment using an avatar that includes a mapping of their video stream (e.g., avatars 102A and 102B). The user may have a camera on a device to capture their video stream. The video stream may include the user and the user's physical surroundings (e.g., desk, wall, chair, pictures, etc.). However, the user may wish for their avatar to be presented with the video stream, excluding their physical surroundings. A configuration setting in user interface 500 may specify that user preference. In addition, the configuration settings may specify a smoothness to any edges of the video stream on their avatar and a framerate to apply background removal.

As will be discussed below, AI may be used to determine which portions of a video frame represent a user and which portions of the video frame present the user's surroundings.

Additionally or alternatively, configuration settings in user interface 500 may specify other desired characteristics of a user's avatar (e.g., color, thickness, patterning, etc.). The color can include color of the user's avatar outside of the portion where a video is mapped. For example, the color can include a rear silhouette.

Additionally or alternatively, the user can assist any computer processing of physical surroundings using a physically present and solid colored background (e.g., a green or blue screen). In that embodiment, the configuration settings can include a existence of a physically present background, background color (both the actual color and a degree of similarity with that color) that the user desires to be replaced with a solid colored background.

Figure 6A:
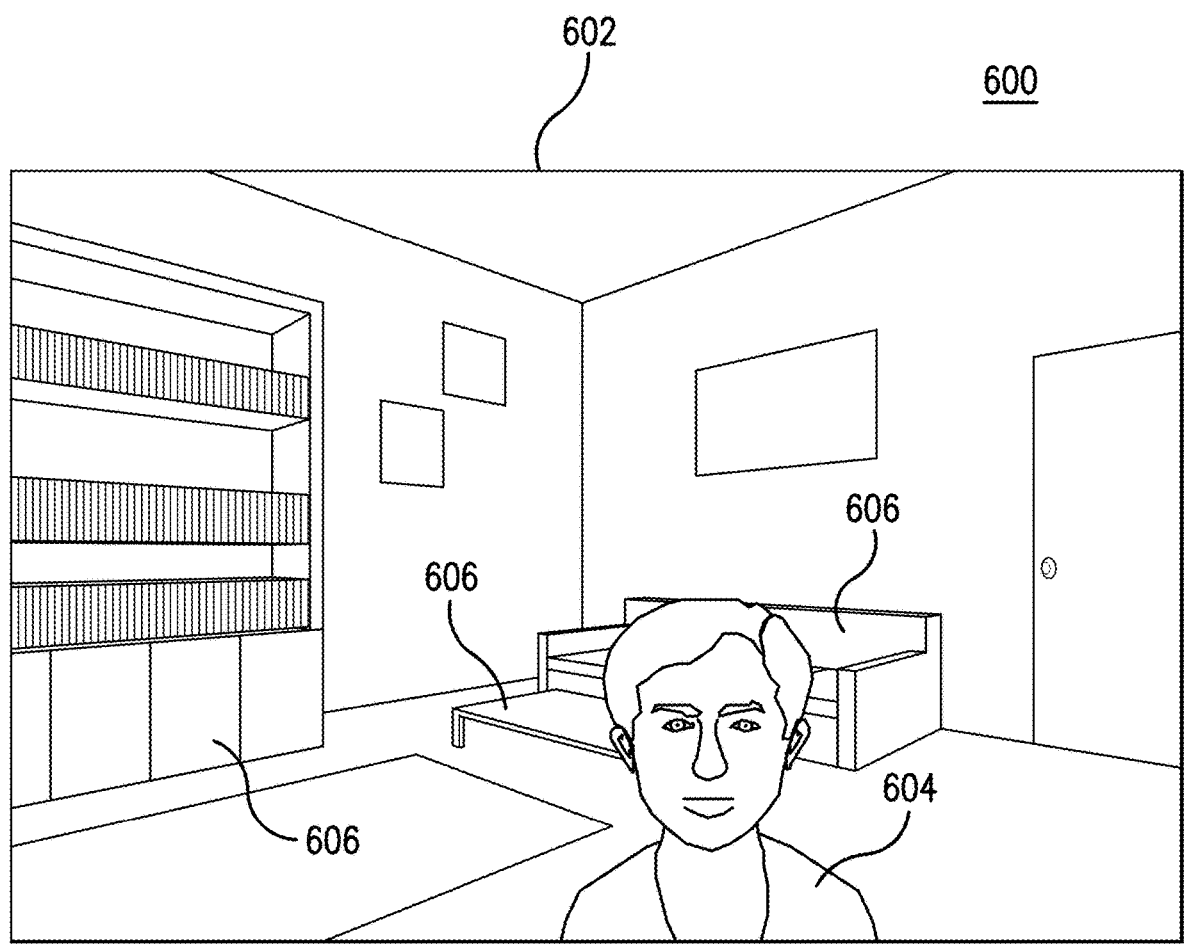
FIGS. 6A-6B are illustrations of a video stream of a user when altering avatar backgrounds and rendering volumetric avatars.
Figure 6B:
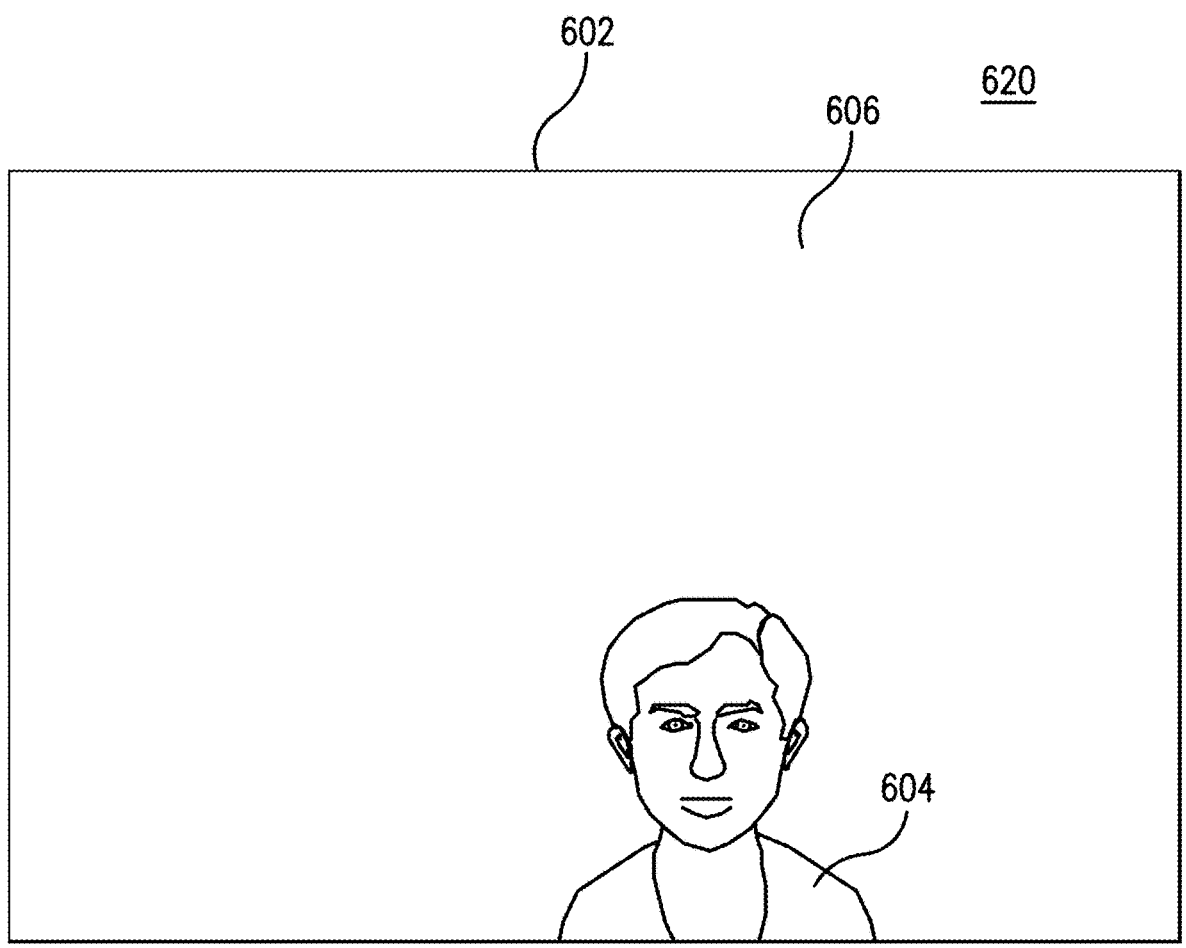

FIGS. 6A-6B are illustrations of a video stream 602 of a user 604 when altering avatar backgrounds and rendering volumetric avatars. Video stream 602 can be captured by a device of user 604, such as a camera. The capturing device can also be configured to process video stream 602 and provide the 3D virtual environment. Alternatively, the capturing device can be configured to interface with a separate device of user 604 that performs processing and provides other services. In this aspect, the capturing device can interface with the separate device over a network. The network can be wired, wireless, or a combination thereof. The network can include any combination of local area networks, wide area networks, the internet, or other configuration as would be appreciated by a POSA.

FIG. 6A illustrates video stream 602 capturing user 604 and user 604's physical surroundings 606. When user 604 desires physical surroundings 606 to be excluded from their avatar, they can provide such inputs in configuration settings (described above with reference to FIG. 5). As the video stream is received, it can be analyzed to determine which portions (e.g., pixels) represent user 604 and which represent physical surroundings 606.

In some aspects, user 604 physically places a solid colored background behind them to assist in background alteration (see FIG. 6B for a general illustration). In this aspect, the video stream is analyzed to determine which portions represent user 604 and which represent the solid colored background. Based on the configuration settings, user 604 has already provided the color of the physically placed background or the system is capable of automatically detecting the color of the physically placed background, so the analysis is conducted by detecting which pixels are that color (i.e., physically placed background) and which pixels are not that color (i.e., user 604).

In other embodiments, physical surroundings 606 are excluded entirely by using computer vision techniques. In this aspect, the portions determined to represent physical surroundings 606 are altered to produce an altered background. The portions determined to represent physical surroundings 606 can be altered by converting each pixel to a solid colored background. User 604 may have selected which color in the configuration settings. To determine which portions to represent physical surroundings 606, the video stream is initially analyzed with a neural network to detect which pixels represent user 604 and which pixels represent physical surroundings 606. The neural network can be located on a graphics processing unit of the computer processor, or can be located in another location understood by a POSA. The neural network can be trained using an existing library, such as Selfie Segmentation by Google (MediaPipe). Alternatively, the neural network can be trained with a new library of images comprising a user and physical surroundings. Once the neural network has detected which pixels represent physical surroundings 606, these pixels can be altered by replacing them with a solid colored background using a mask. The mask can be an image assigning a value between zero and one to every pixel, or a binary image consisting of zero and non-zero values. The mask distinguishes between user 604 and physical surroundings 606. Processing with the neural network can occur at a rate less than the frame rate at which the 3D virtual environment is eventually rendered. Alternatively, processing with the neural network can occur at a rate less than the frame rate of the captured video stream. For example, if the 3D virtual environment is rendered or the video stream is captured at 25 frames per second (fps), than the neural network may be applied at a rate of 10 fps. This may save scarce computing resources.

The physical surroundings 606 can then be replaced with a solid colored background using a canvas HTML, element and the mask. Using the mask, video stream 602 is drawn to the canvas HTML element. The physical surroundings 606 are then replaced with the solid colored background based on the value contained in the mask. This canvas is used to draw the graphic using JavaScript. Other effects can also be added to the colored background using this canvas. The canvas of the solid colored background can then be translated into the video stream using an Application Programming Interface.

Referring to FIG. 6B, video stream 602 now contains user 604 and either the physical placed solid colored background as 606 or the computer processed altered background containing solid colored pixels as 606. In either aspect, the configuration settings and video stream 602 with the solid colored background can be sent, over a network, to another device belonging to another user. The configuration settings and video stream 602 can be communicated through a communications server, such as mediasoup. This device (e.g., a second device of a second user) can use the configuration settings to render an avatar corresponding to user 604. Using video stream 602 and the configuration settings, this device can render the avatar with video stream 602 and solid colored background 606 (such as avatar 102A and 102B). This device can render the avatar from the perspective of a virtual camera corresponding to this other user (e.g., second user). From this perspective and depending on the configuration settings, the avatar can appear with user 604 and a solid colored background that is different from the 3D virtual environment. In other words, user 604 appears to move through the 3D virtual environment with a solid colored background that visually separates them from the virtual environment. However, in other aspects and referring to FIGS. 7A-7F, the avatar can appear with user 604 and the previously solid colored background can be rendered as transparent, allowing other user's to see through to the 3D virtual environment. In other words, user 604 appears as though they are part of the 3D virtual environment, without any visual reference to their actual physical surroundings or a solid colored alteration. In further aspects, a transparency can be applied to soften edges of the avatar.

Figure 7A:
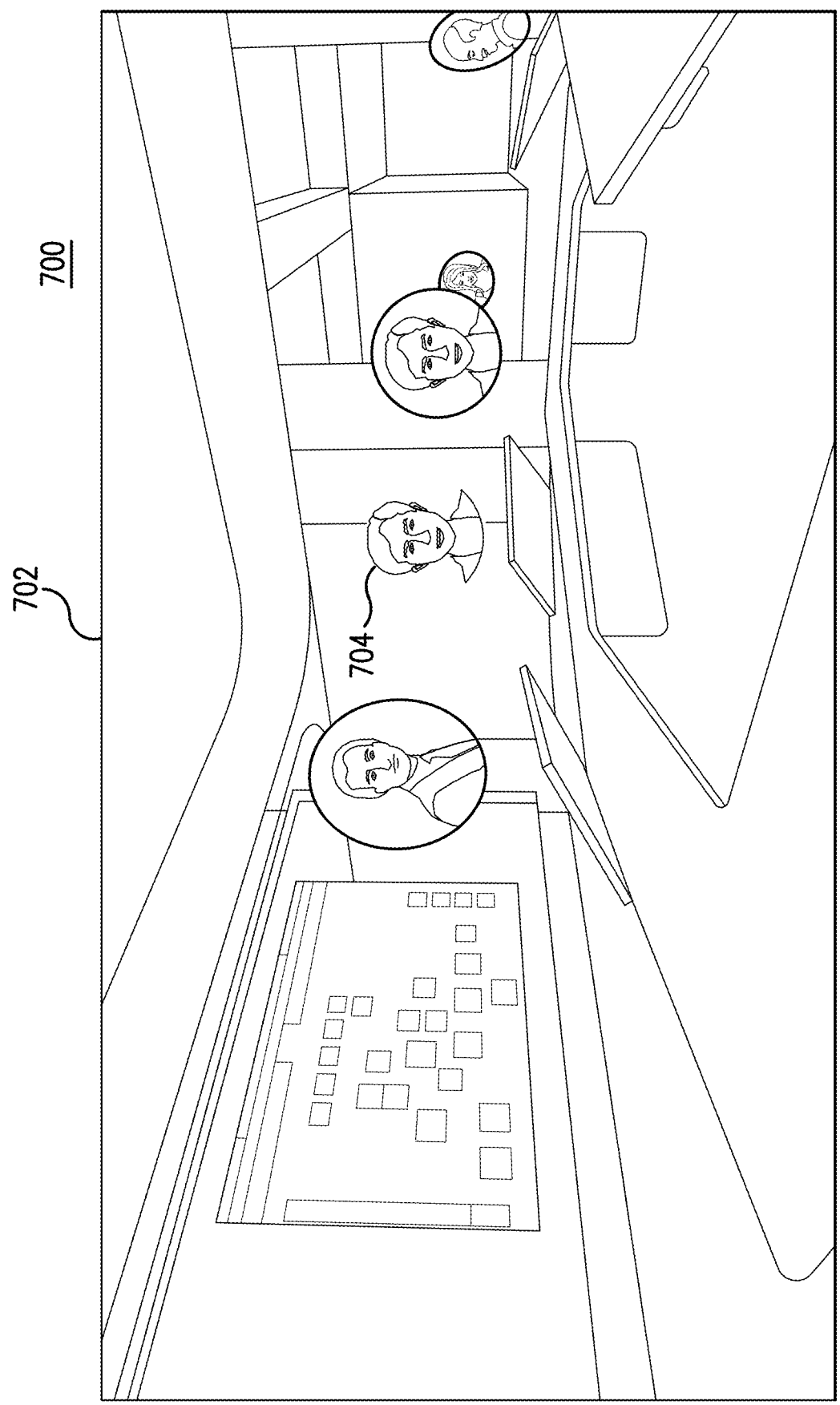
FIGS. 7A-7F are illustrations of a perspective from a virtual camera in a three-dimensional (3D) virtual environment, and associated diagrams of the 3D virtual environment, when rendering volumetric avatars.
Figure 7B:
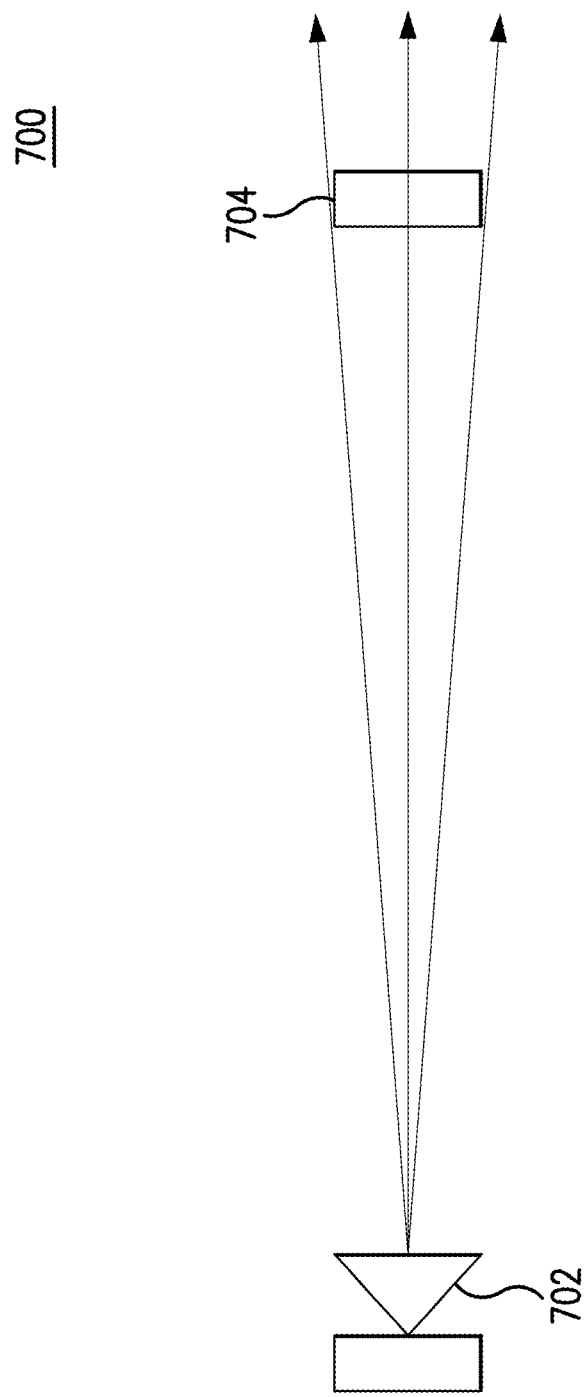
Figure 7C:
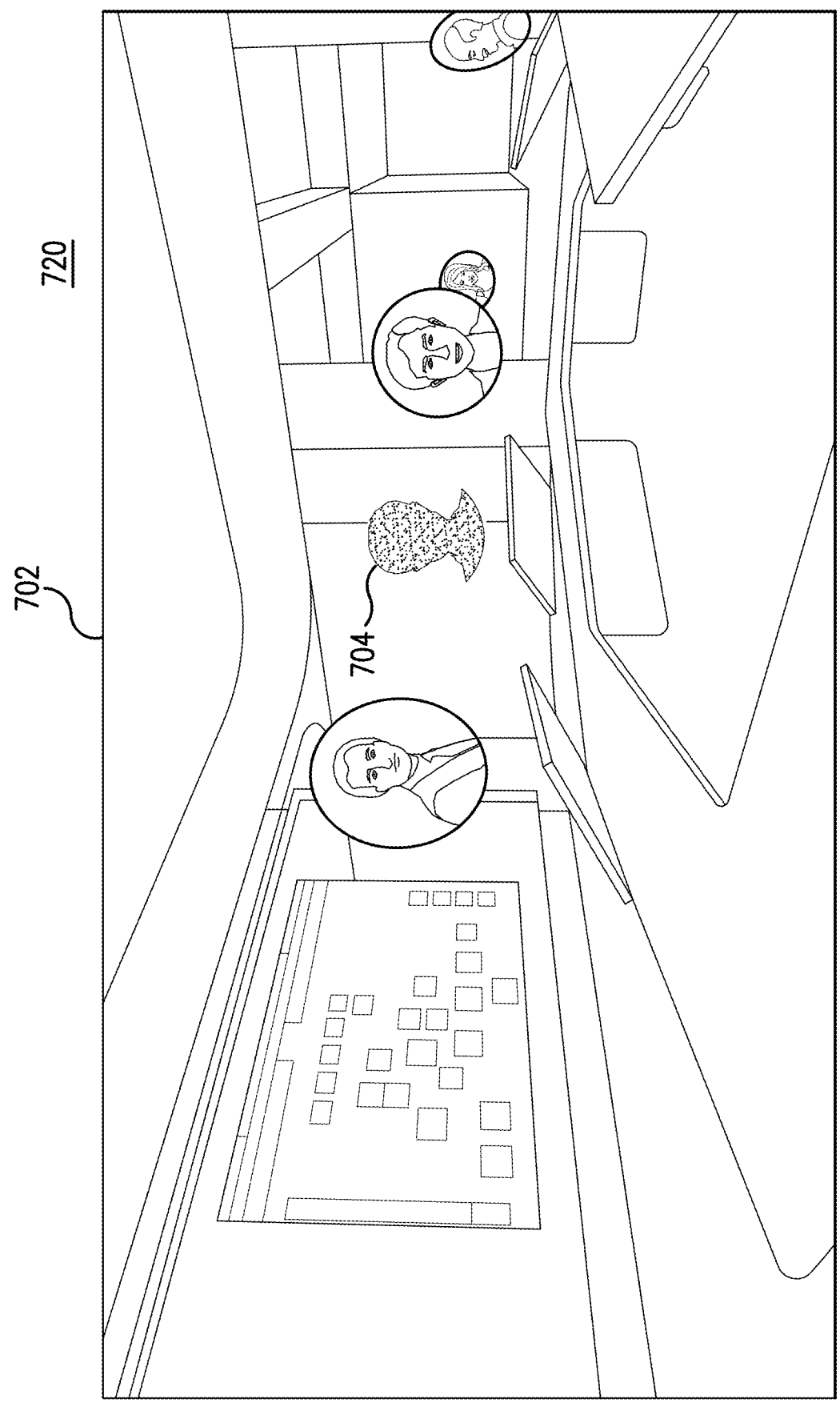
Figure 7D:
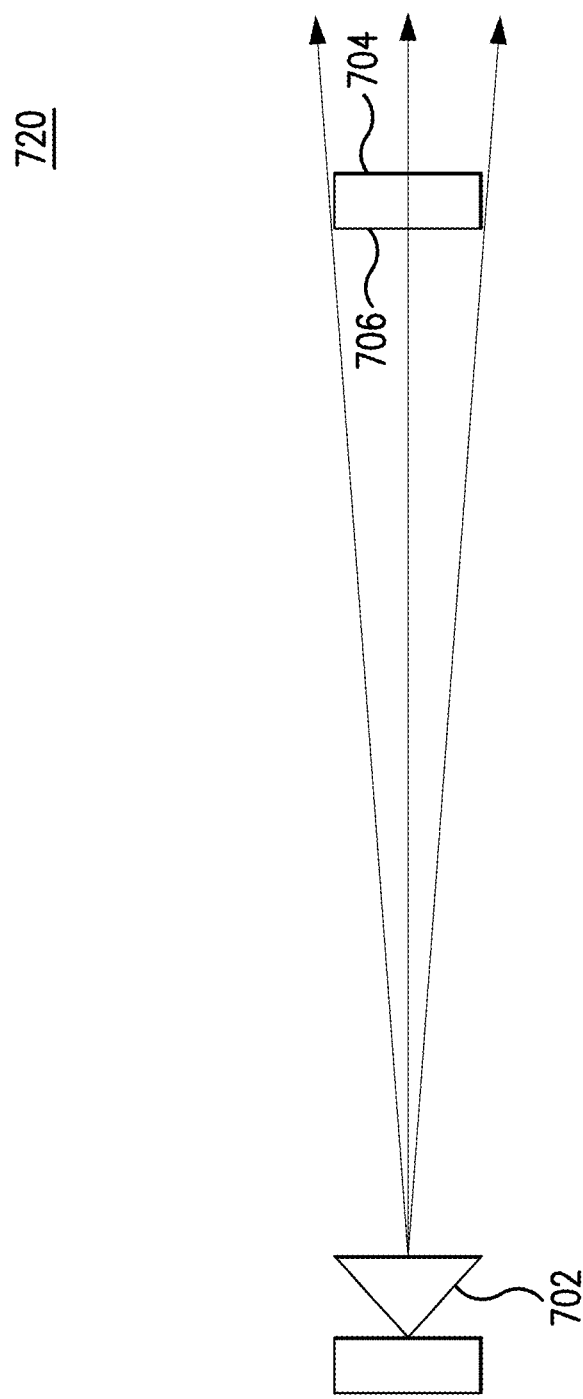
Figure 7E:
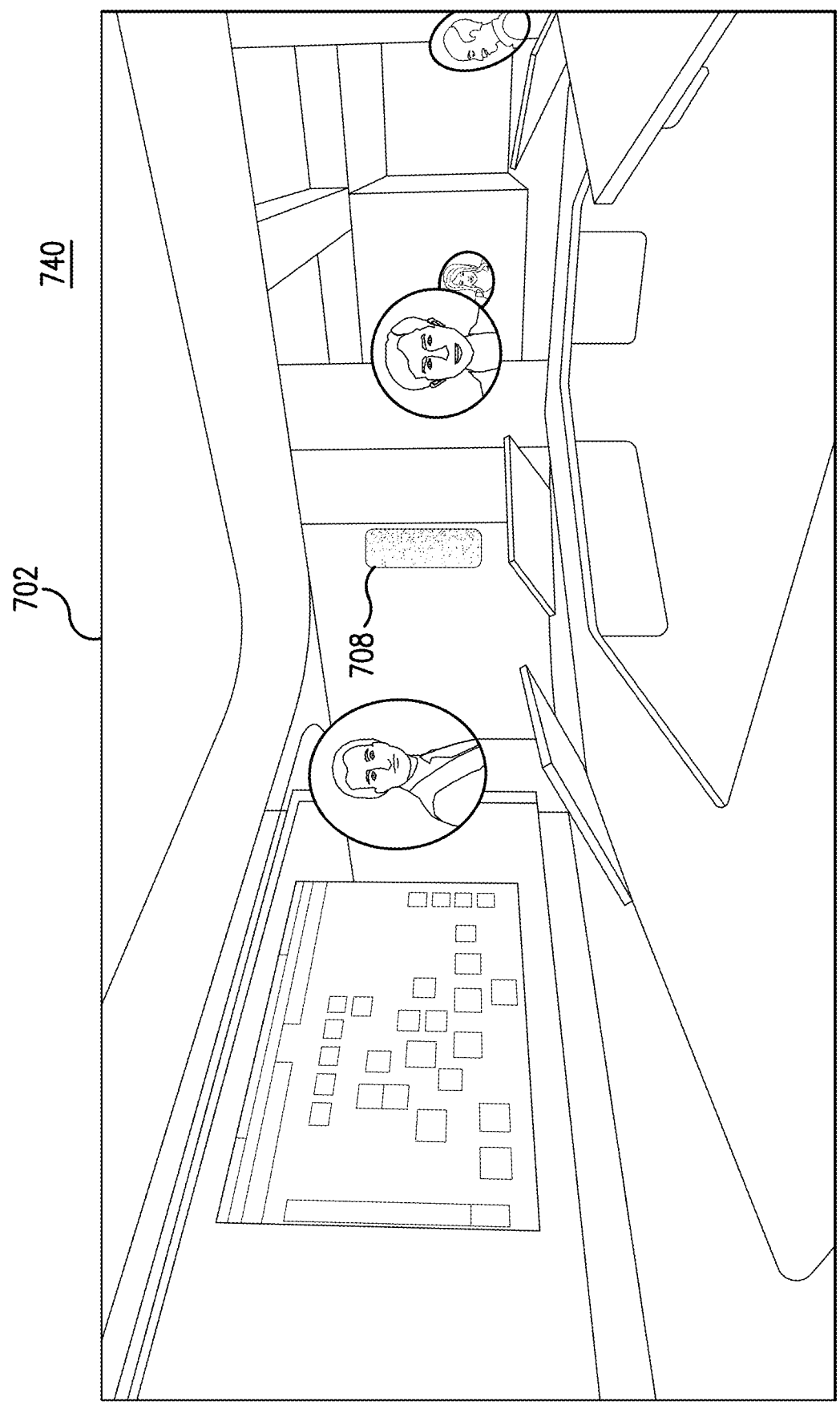
Figure 7F:
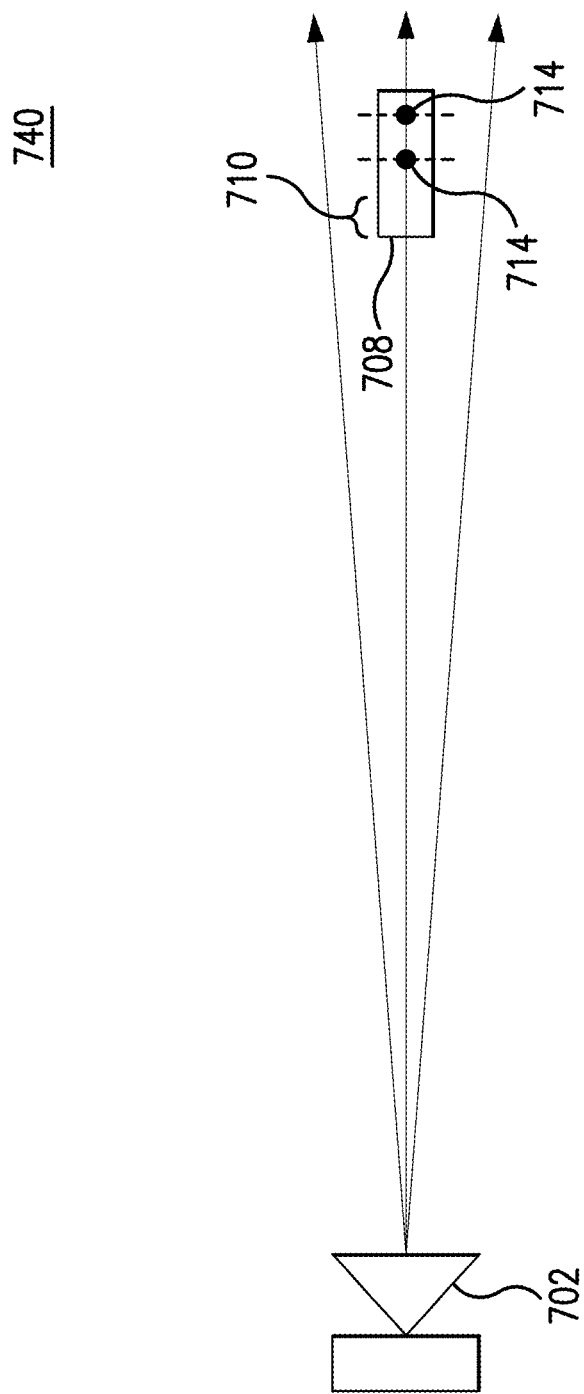

FIGS. 7A-7F are illustrations of a perspective from a virtual camera 702 in a three-dimensional virtual environment, and associated diagrams of the 3D virtual environment, when rendering volumetric avatars. FIG. 7A illustrates a perspective when viewing a front surface 704 of an avatar. FIG. 7B is a diagram illustrating the perspective in FIG. 7A. FIG. 7C illustrates a perspective when viewing a back surface 706 of the avatar. FIG. 7D is a diagram illustrating the perspective in FIG. 7C. FIG. 7E illustrates a perspective when viewing a side surface 708 of the avatar. FIG. 7F is a diagram illustrating the perspective in FIG. 7E.

Rendering volumetric avatars involves the rendering of avatars of other users. For example, a first user device may render an avatar with a video stream containing user 604 (e.g., a second user, referring to FIGS. 6A-B). To render the avatar of the other user (e.g., second user), the first user device may receive configuration settings and a video stream of the other user, sent from the other user. The video stream captures the other user and their physical surroundings or background. These configuration settings may contain input on how the other user wishes to be perceived by the first user (e.g., background of video stream, color of avatar or background, shape of avatar, etc.). These configuration settings can change how the volumetric avatars are rendered. Then, from the perspective of virtual camera 702 corresponding to the first user, the avatar can be rendered. Depending on whether virtual camera 702 faces the front, back, or sides of the avatar, the rendering process can differ.

Figure 12:
FIG. 12 is an illustration of a user interface containing a front surface of a rendered volumetric avatar in a three-dimensional virtual environment.

Referring to FIGS. 7A and 7B, front surface 704 of the second user's avatar can be rendered with a video stream containing the second user. Front surface 704 can be rendered only when virtual camera 702 faces the front surface of the second user's avatar. The avatar can be rendered without a background, as shown in FIG. 7A. In other words, the avatar appears to be part of the 3D virtual environment. This is shown in FIG. 12, an illustration of a user interface containing the front surface of the avatar in the 3D virtual environment. To render the avatar, a volumetric shape can be constructed around the avatar. The volumetric shape encompasses all of the avatar. The volumetric shape can be a rectangular prism, a cylinder, or any other 3D geometric shape as would be appreciated by a POSA. Then, from within the volumetric shape around the avatar, a shape of the avatar can be calculated. With this calculated shape, any pixels outside of the shape can be excluded for further processing. Pixels from within the shape of the avatar can then be compared to an inputted color (i.e., background color) from the configuration settings. Pixels that are found to have the same color as the inputted color can be altered. In some aspects, those pixels can be removed. In other aspects, such as those shown in FIG. 7A, those pixels can be made transparent.

Figure 13:
FIG. 13 is an illustration of a user interface containing a back surface of a rendered volumetric avatar in a three-dimensional virtual environment.

Referring to FIGS. 7C and 7D, back surface 706 of the second user's avatar can be rendered with a silhouette, allowing other users to know that the second user is facing away from them in the 3D virtual environment. Back surface 706 is a silhouette when rendered without video stream 602 and a background. Back surface 706 can be rendered only when virtual camera 702 faces the back surface of the second user's avatar. This is shown in FIG. 13, an illustration of a user interface containing the back surface of the avatar in the 3D virtual environment. Rendering back surface 706 occurs similarly to rendering front surface 704. A volumetric shape can be constructed around the avatar. The volumetric shape encompasses all of the avatar. The volumetric shape can be a rectangular prism, a cylinder, or any other 3D geometric shape as would be appreciated by a POSA. Then, from within the volumetric shape around the avatar, a shape of the avatar can be calculated. With this calculated shape, any pixels outside of the shape can be excluded for further processing. Pixels from within the shape of the avatar can then be compared to an inputted color (i.e., background color) from the configuration settings. Pixels that are found to have the same color as the inputted color can be altered.

In some aspects, those pixels can be removed. In other aspects, such as those shown in FIG. 7C, those pixels can be made transparent.

Pixels that are found to have a different color from the inputted color (i.e., those corresponding to user 604) can be replaced with pixels that are a different solid color. In other words, pixels that correspond to user 604's silhouette can be replaced with a solid color to create a visual representation of the silhouette. Further, an intersection can be calculated between points on front surface 704 and back surface 706, useful when rendering a side surface of the avatar.

Figure 14:
FIG. 14 is an illustration of a user interface containing a side surface of a rendered volumetric avatar in a three-dimensional virtual environment.

Referring to FIGS. 7E and 7F, side surface 708 of the second user's avatar can be rendered using ray marching, allowing other users to know that the second user is facing roughly perpendicular to them in the 3D virtual environment. Side surface 708 can be rendered only when virtual camera 702 faces the side surface of the second user's avatar. This is shown in FIG. 14, an illustration of a user interface containing the side surface of the avatar in the 3D virtual environment. To render side surface 708, a thickness can be applied to the avatar. A pixel 714 can then be sampled from within the thickness of the avatar using ray marching. A number of pixels 714 can be sampled in a series of predetermined steps. For example, pixel 714 can be sampled using one step, or two pixels 714 can be sampled using two steps. The size of each step is also predetermined, and can correspond to the size of the avatar. A random offset 710 can also be applied to the sampling process, so that the series of predetermined steps only begins after the offset.

Using the points of intersection calculated with reference to FIGS. 7C and 7D, a point corresponding to a pixel found to have the same color as the inputted color can be projected onto the front surface 704 and back surface 706 of the avatar. This projection will be useful when rendering side surface 708 through the thickness of the avatar.

Rendering side surface 708 then occurs similarly to rendering front surface 704. A volumetric shape can be constructed around the avatar. The volumetric shape encompasses all of the avatar. The volumetric shape can be a rectangular prism, a cylinder, or any other 3D geometric shape as would be appreciated by a POSA. Then, from within the volumetric shape around the avatar, a shape of the avatar can be calculated. With this calculated shape, any pixels outside of the shape can be excluded for further processing. Pixels from within the shape of the avatar can then be compared to an inputted color (i.e., background color) from the configuration settings. The color of these pixels is determined using the colors of the projections onto the front surface 704 and back surface 706. Pixels that are found to have a different color from the inputted color (i.e., those corresponding to user 604) can be replaced with pixels that are the same color as the solid color used for back surface 706. In addition, a patterning can be applied to these solid colored pixels that extend over the thickness of the avatar. For example, as shown in FIG. 7E, a gradient coloring can be applied to the thickness of the avatar. In another example, the patterning could appear as blue noise or could move.

In alternative aspects, front surface 704, back surface 706, and side surface 708 can be rendered using a mesh, a depth image/stream, ray casting, or any other method as would be appreciated by a POSA. For example, using depth image/stream rendering, new views can be generated as the scene geometry is given by an additional depth stream which stores its distance to the user webcam or a depth measurement device for each pixel.

Figure 8:
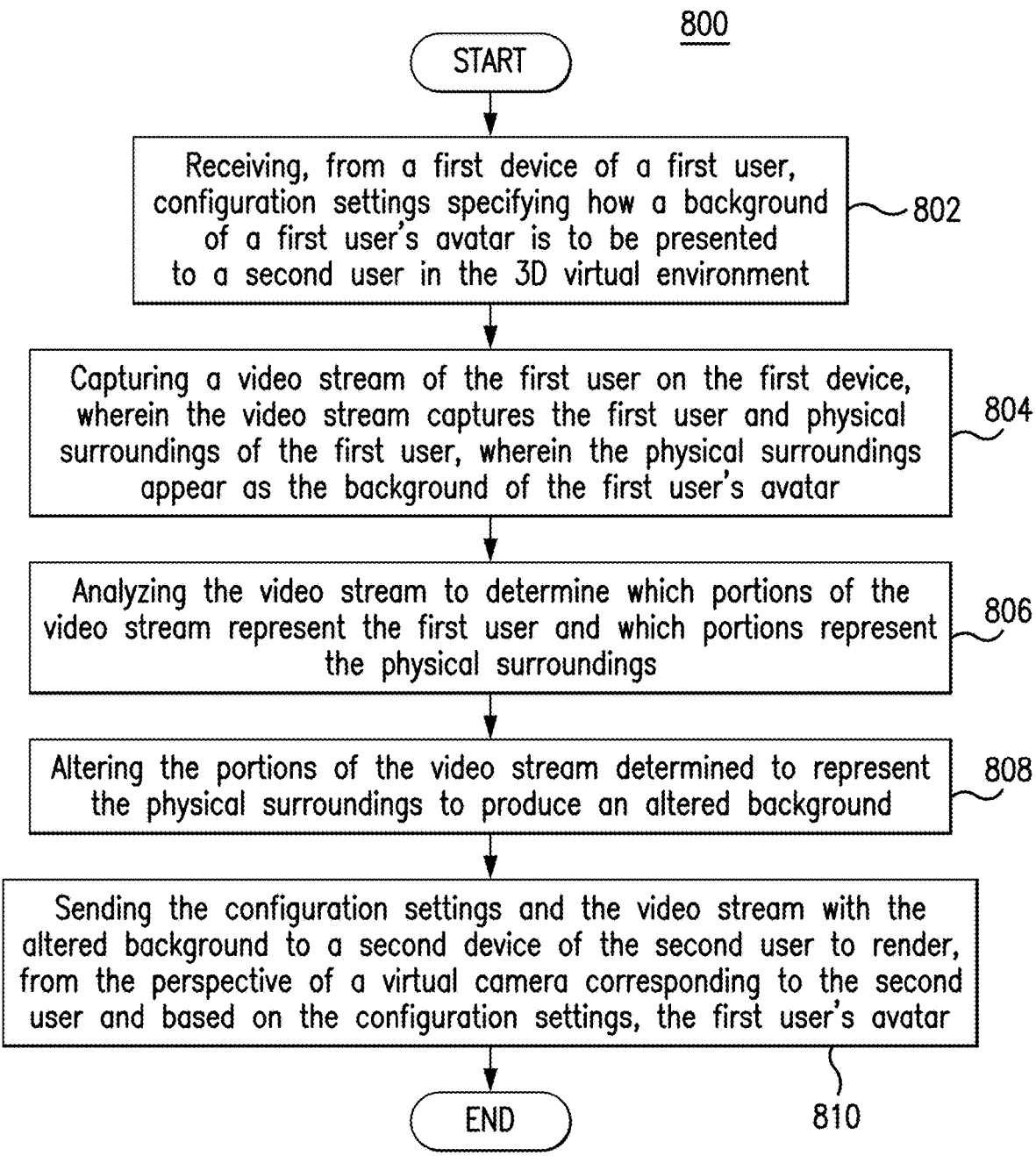
FIG. 8 is a flowchart illustrating a method for altering avatar backgrounds.

FIG. 8 is a flowchart illustrating a method for altering avatar backgrounds. It is to be appreciated that not all steps may be needed to perform the disclosure provided herein. Further, some of the steps can be performed simultaneously, or in a different order than shown in FIG. 8, as would be understood by a person of ordinary skill in the art.

Method 800 can be implemented by system 300 and operations caused by computer system 1100. Method 800 can be further understood with reference to FIGS. 5-6B. However, method 800 is not limited to these example aspects.

In step 802, configuration settings specifying how a background of a first user's avatar is to be presented to a second user in the 3D virtual environment is received from a first device of a first user. Configuration settings can include whether background removal is enabled or disabled, a background color if the user desires for their physical surroundings to be replaced with a solid colored background, a transparency selection if the user desires for their physical surroundings to be replaced with a transparent background, a cutoff shape of the video stream on their avatar, existence of a physically present background and its color, or a smoothness to any edges of the video stream on their avatar.

In step 804, a video stream of the first user is captured on the first device. The video stream captures the first user and physical surroundings of the first user, and the physical surroundings appear as the background of to an image of the first user. The capturing device can also be configured to process the video stream and provide the 3D virtual environment. Alternatively, the capturing device can be configured to interface with a separate device of the first user that performs processing and provides other services. In this aspect, the capturing device can interface with the separate device over a network. The network can be wired, wireless, or a combination thereof. The network can include any combination of local area networks, wide area networks, the interne, or other configuration as would be appreciated by a POSA.

In step 806, the video stream is analyzed to determine which portions of the video stream represent the first user and which portions represent the physical surroundings. In some aspects, the first user has physically placed a solid colored background behind them in order to assist in background alteration (see FIG. 6B for a general illustration). In this aspect, the video stream is analyzed to determine which portions represent the first user and which represent the solid colored background. Based on the configuration settings, the first user has already provided the color of the physically placed background or the system is capable of automatically detecting the color of the physically placed background, so the analysis is conducted by detecting which pixels are that color (i.e., physically placed background) and which pixels are not that color (i.e., the first user). In other aspects, the physical surroundings are excluded entirely by computer processing.

In step 808, the portions of the video stream determined to represent the physical surroundings are altered to produce an altered background. In some aspects, the portions determined to represent physical surroundings can be altered by converting each pixel to a solid colored background. The first user may have selected which color in the configuration settings. In other aspects, the video stream is initially analyzed with a neural network to detect which pixels represent the first user and which pixels represent physical surroundings. The neural network can be located on a graphics processing unit of the computer processor, or can be located in another location understood by a POSA. The neural network can be trained using an existing library, such as Selfie Segmentation by Google (MediaPipe). Alternatively, the neural network can be trained with a new library of images comprising a user and physical surroundings. Once the neural network has detected which pixels represent physical surroundings, these pixels can be altered by replacing them with a solid colored background using a mask. The mask can be an image assigning a value between zero and one to every pixel, or a binary image consisting of zero and non-zero values. The mask distinguishes between the user and the physical surroundings. Processing with the neural network can occur at a rate less than the frame rate at which the 3D virtual environment is eventually rendered. Alternatively, processing with the neural network can occur at a rate less than the frame rate of the captured video stream. For example, if the the 3D virtual environment is rendered or the video stream is captured at 25 frames per second (fps), than the neural network may be applied at a rate of 10 fps.

The physical surroundings 606 can then be replaced with a solid colored background using a canvas HTML element and the mask. Using the mask, video stream 602 is drawn to the canvas HTML element. The physical surroundings 606 are then replaced with the solid colored background based on the value contained in the mask. This canvas is used to draw the graphic using JavaScript. Other effects can also be added to the colored background using this canvas. The canvas of the solid colored background can then be translated into the video stream using an Application Programming Interface.

In step 810, the configuration settings and the video stream with the altered background are sent to a second device of the second user. These sent items are used to render the first user's avatar from the perspective of a virtual camera corresponding to the second user and based on the configuration settings. The configuration settings and video stream with the solid colored background can be sent, over a network, to a second device belonging to a second user. The configuration settings and video stream can be communicated through a communications server, such as mediasoup. This device (e.g., a second device of a second user) can use the configuration settings to render an avatar corresponding to the first user. Using the video stream and the configuration settings, this device can render the avatar with the video stream and the solid colored background (such as avatar 102A and 102B). This device can render the avatar from the perspective of a virtual camera corresponding to this other user (e.g., second user). From this perspective and depending on the configuration settings, the avatar can appear with the first user and a solid colored background that is different from the 3D virtual environment. In other words, the first user appears to move through the 3D virtual environment with a solid colored background that visually separates them from the virtual environment. However, in other aspects, the avatar can appear with the first user and the previously solid colored background can be rendered as transparent, allowing other user's to see through to the 3D virtual environment. In other words, the first user appears as though they are part of the 3D virtual environment, without any visual reference to their actual physical surroundings or a solid colored alteration. In further aspects, a transparency can be applied to soften edges of the avatar.

Figure 9:
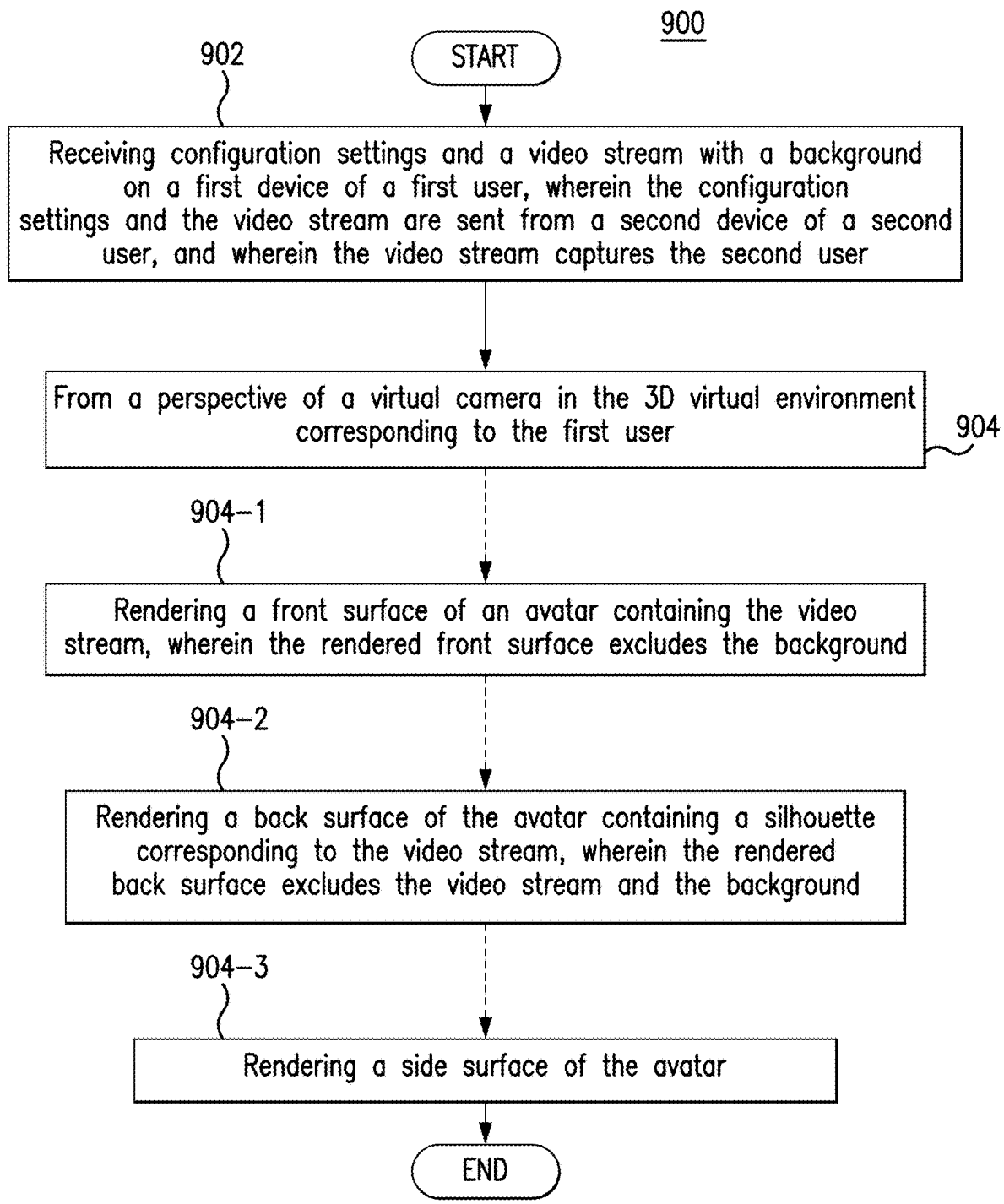
FIG. 9 is a flowchart illustrating a method for rendering volumetric avatars.

FIG. 9 is a flowchart illustrating a method for rendering volumetric avatars. It is to be appreciated that not all steps may be needed to perform the disclosure provided herein. Further, some of the steps can be performed simultaneously, or in a different order than shown in FIG. 9, as would be understood by a person of ordinary skill in the art.

Method 900 can be implemented by system 300 and operations caused by computer system 1100. Method 900 can be further understood with reference to FIGS. 5-7F. However, method 900 is not limited to these example aspects.

In step 902, configuration settings and a video stream with a background is received on a first device of a first user. The configuration settings and the video stream are sent from a second device of a second user, and the video stream captures the second user. These configuration settings may contain input on how the other user wishes to be perceived by the first user (e.g., background of video stream, color of avatar or background, shape of avatar, etc.). These configuration settings can change how the volumetric avatars are rendered.

In step 904, several operations occur from a perspective of a virtual camera in the 3D virtual environment corresponding to the first user. In step 904-1, a front surface of an avatar containing the video stream is rendered. The rendered front surface excludes the background. The front surface can be rendered only when the virtual camera faces the front surface of the second user's avatar. The avatar can be rendered without a background. In other words, the avatar appears to be part of the 3D virtual environment. To render the avatar, a volumetric shape can be constructed around the avatar. The volumetric shape encompasses all of the avatar. The volumetric shape can be a rectangular prism, a cylinder, or any other 3D geometric shape as would be appreciated by a POSA. Then, from within the volumetric shape around the avatar, a shape of the avatar can be calculated. With this calculated shape, any pixels outside of the shape can be excluded for further processing. Pixels from within the shape of the avatar can then be compared to an inputted color (i.e., background color) from the configuration settings. Pixels that are found to have the same color as the inputted color can be altered. In some aspects, those pixels can be removed. In other aspects, those pixels can be made transparent.

In step 904-2, a back surface of the avatar containing a silhouette corresponding to the video stream is rendered. The rendered back surface excludes the video stream and the background. The back surface can be rendered only when the virtual camera faces the back surface of the second user's avatar. A volumetric shape can be constructed around the avatar. The volumetric shape encompasses all of the avatar. The volumetric shape can be a rectangular prism, a cylinder, or any other 3D geometric shape as would be appreciated by a POSA. Then, from within the volumetric shape around the avatar, a shape of the avatar can be calculated. With this calculated shape, any pixels outside of the shape can be excluded for further processing. Pixels from within the shape of the avatar can then be compared to an inputted color (i.e., background color) from the configuration settings. Pixels that are found to have the same color as the inputted color can be altered. In some aspects, those pixels can be removed. In other aspects, those pixels can be made transparent.

Pixels that are found to have a different color from the inputted color (i.e., those corresponding to the second user) can be replaced with pixels that are a different solid color. In other words, pixels that correspond to the second user's silhouette can be replaced with a solid color to create a visual representation of the silhouette. Further, an intersection can be calculated between points on the front surface and the back surface, useful when rendering a side surface of the avatar.

In step 904-3, a side surface of the avatar is rendered. The side surface can be rendered only when the virtual camera faces the side surface of the second user's avatar. To render the side surface, a thickness can be applied to the avatar. A pixel can then be sampled from within the thickness of the avatar using ray marching. A number of pixels can be sampled in a series of predetermined steps. For example, pixel can be sampled using one step, or two pixels can be sampled using two steps. The size of each step is also predetermined, and can correspond to the size of the avatar. A random offset can also be applied to the sampling process, so that the series of predetermined steps only begins after the offset. Using the points of intersection calculated in 904-2, a point corresponding to a pixel found to have the same color as the inputted color can be projected onto the front surface and the back surface of the avatar.

A volumetric shape can be constructed around the avatar. The volumetric shape encompasses all of the avatar. The volumetric shape can be a rectangular prism, a cylinder, or any other 3D geometric shape as would be appreciated by a POSA. Then, from within the volumetric shape around the avatar, a shape of the avatar can be calculated. With this calculated shape, any pixels outside of the shape can be excluded for further processing. Pixels from within the shape of the avatar can then be compared to an inputted color (i.e., background color) from the configuration settings. The color of these pixels is determined using the colors of the projections onto the front surface and back surface. Pixels that are found to have a different color from the inputted color (i.e., those corresponding to the second user) can be replaced with pixels that are the same color as the solid color used for the back surface. In addition, a patterning can be applied to these solid colored pixels that extend over the thickness of the avatar. For example, a gradient coloring can be applied to the thickness of the avatar. In another example, the patterning could appear as blue noise or could move.

In alternative aspects, the front surface, back surface, and side surface can be rendered using a mesh, a depth image/stream, ray casting, or any other method as would be appreciated by a POSA.

Figure 10:
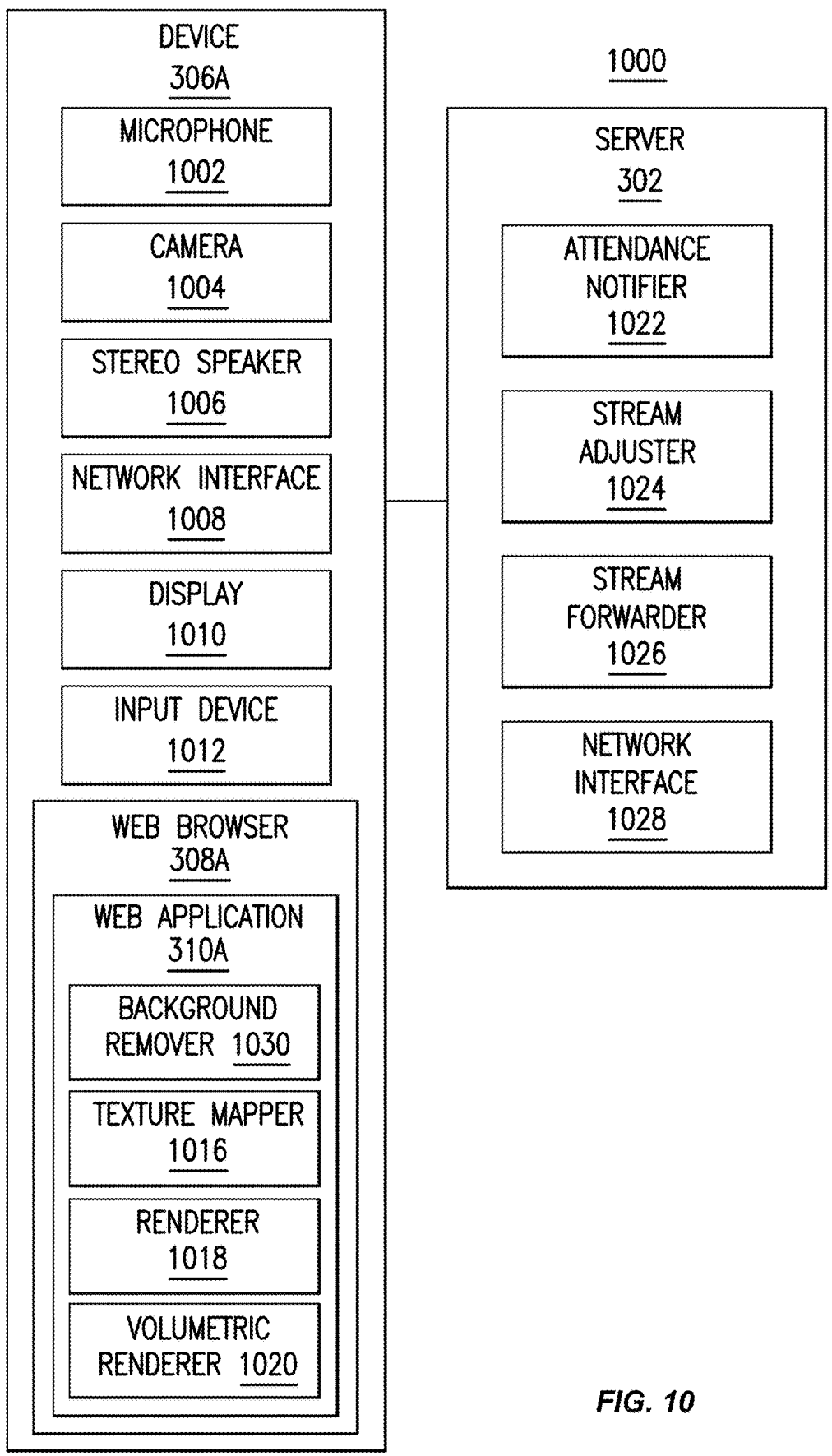
FIG. 10 is a diagram illustrating components of devices used to provide videoconferencing within a virtual environment.

Device Components and Computer Systems for Videoconferencing in a Virtual Environment FIG. 10 is a diagram of a system 1000 illustrating components of devices used to provide videoconferencing within a virtual environment. In various aspects, system 1000 can operate according to the methods described above.

Device 306A is a user computing device. Device 306A could be a desktop or laptop computer, smartphone, tablet, or wearable device (e.g., watch or head mounted device). Device 306A includes a microphone 1002, camera 1004, stereo speaker 1006, and input device 1012. Not shown, device 306A also includes a processor and persistent, non-transitory and volatile memory. The processors can include one or more central processing units, graphic processing units or any combination thereof.

Microphone 1002 converts sound into an electrical signal. Microphone 1002 is positioned to capture speech of a user of device 306A. In different examples, microphone 1002 could be a condenser microphone, electret microphone, moving-coil microphone, ribbon microphone, carbon microphone, piezo microphone, fiber-optic microphone, laser microphone, water microphone, or MEMs microphone.

Camera 1004 captures image data by capturing light, generally through one or more lenses. Camera 1004 is positioned to capture photographic images of a user of device 306A. Camera 1004 includes an image sensor (not shown). The image sensor may, for example, be a charge coupled device (CCD) sensor or a complementary metal oxide semiconductor (CMOS) sensor. The image sensor may include one or more photodetectors that detect light and convert it to electrical signals. These electrical signals captured together in a similar timeframe comprise a still photographic image. A sequence of still photographic images captured at regular intervals together comprise a video. In this way, camera 1004 captures images and videos.

Stereo speaker 1006 is a device which converts an electrical audio signal into a corresponding left-right sound. Stereo speaker 1006 outputs the left audio stream and the right audio stream generated by an audio processor to be played to device 306A's user. Stereo speaker 1006 includes both ambient speakers and headphones that are designed to play sound directly into a user's left and right ears. Example speakers includes moving-iron loudspeakers, piezoelectric speakers, magnetostatic loudspeakers, electrostatic loudspeakers, ribbon and planar magnetic loudspeakers, bending wave loudspeakers, flat panel loudspeakers, heil air motion transducers, transparent ionic conduction speakers, plasma arc speakers, thermoacoustic speakers, rotary woofers, moving-coil, electrostatic, electret, planar magnetic, and balanced armature.

Network interface 1008 is a software or hardware interface between two pieces of equipment or protocol layers in a computer network. Network interface 1008 receives a video stream from server 302 for respective participants for the meeting. The video stream is captured from a camera on a device of another participant to the video conference. Network interface 1008 also receives data specifying a three-dimensional virtual space and any models therein from server 302. For each of the other participants, network interface 1008 receives a position and direction in the three-dimensional virtual space. The position and direction are input by each of the respective other participants.

Network interface 1008 also transmits data to server 302. It transmits the position of device 306A's user's virtual camera used by renderer 1018 and it transmits video and audio streams from camera 1004 and microphone 1002.

Display 1010 is an output device for presentation of electronic information in visual or tactile form (the latter used for example in tactile electronic displays for blind people). Display 1010 could be a television set, computer monitor, head-mounted display, heads-up displays, output of a augmented reality or virtual reality headset, broadcast reference monitor, medical monitors mobile displays (for mobile devices), or Smartphone displays (for smartphones). To present the information, display 1010 may include an electroluminescent (ELD) display, liquid crystal display (LCD), light-emitting diode (LED) backlit LCD, thin-film transistor (TFT) LCD, light-emitting diode (LED) display, organic light-emitting diode (OLED) display, active-matrix organic light-emitting diode (AMOLED) display, plasma (PDP) display, or quantum dot (QLED) display.

Input device 1012 is a piece of equipment used to provide data and control signals to an information processing system such as a computer or information appliance. Input device 1012 allows a user to input a new desired position of a virtual camera used by renderer 1018, thereby enabling navigation in the three-dimensional environment. Examples of input devices include keyboards, mouse, scanners, joysticks, and touchscreens.

Web browser 308A and web application 310A were described above with respect to FIG. 3. Web application 310A includes background remover 1030, texture mapper 1016, renderer 1018, and volumetric rendered 1020.

Background remover 1030 can remove backgrounds from user video streams as described above. Volumetric renderer 1020 can render volumetric avatars in a three-dimensional virtual environment as described above, and can render volumetric avatars with backgrounds removed by background remover 1030.

Texture mapper 1016 texture maps the video stream onto a three-dimensional model corresponding to an avatar. Texture mapper 1016 may texture map respective frames from the video to the avatar. In addition, texture mapper 1016 may texture map a presentation stream to a three-dimensional model of a presentation screen.

Renderer 1018 renders, from a perspective of a virtual camera of the user of device 306A, for output to display 1010 the three-dimensional virtual space including the texture-mapped three-dimensional models of the avatars for respective participants located at the received, corresponding position and oriented in the direction. Renderer 1018 also renders any other three-dimensional models including for example the presentation screen.

Server 302 includes an attendance notifier 1022, a stream adjuster 1024, and a stream forwarder 1026.

Attendance notifier 1022 notifies conference participants when participants join and leave the meeting. When a new participant joins the meeting, attendance notifier 1022 sends a message to the devices of the other participants to the conference indicating that a new participant has joined. Attendance notifier 1022 signals stream forwarder 1026 to start forwarding video, audio, and position/direction information to the other participants.

Stream adjuster 1024 receives a video stream captured from a camera on a device of a first user. Stream adjuster 1024 determines an available bandwidth to transmit data for the virtual conference to the second user. It determines a distance between a first user and a second user in a virtual conference space. And, it apportions the available bandwidth between the first video stream and the second video stream based on the relative distance. In this way, stream adjuster 1024 prioritizes video streams of closer users over video streams from farther ones. Additionally or alternatively, stream adjuster 1024 may be located on device 306A, perhaps as part of web application 310A.

Stream forwarder 1026 broadcasts position/direction information, video, audio, and screen share screens received (with adjustments made by stream adjuster 1024). Stream forwarder 1026 may send information to the device 306A in response to a request from conference application 310A. Conference application 310A may send that request in response to the notification from attendance notifier 1022.

Network interface 1028 is a software or hardware interface between two pieces of equipment or protocol layers in a computer network. Network interface 1028 transmits the model information to devices of the various participants. Network interface 1028 receives video, audio, and screen share screens from the various participants.

Background remover 1030, texture mapper 1016, renderer 1018, volumetric renderer 1020, attendance notifier 1022, stream adjuster 1024, and stream forwarder 1026 can each be implemented in hardware, software, firmware, or any combination thereof System 1000 can also include a screen capturer, configured to capture a presentation stream, and an audio processor, configured to adjust volume of the received audio stream.

Figure 11:
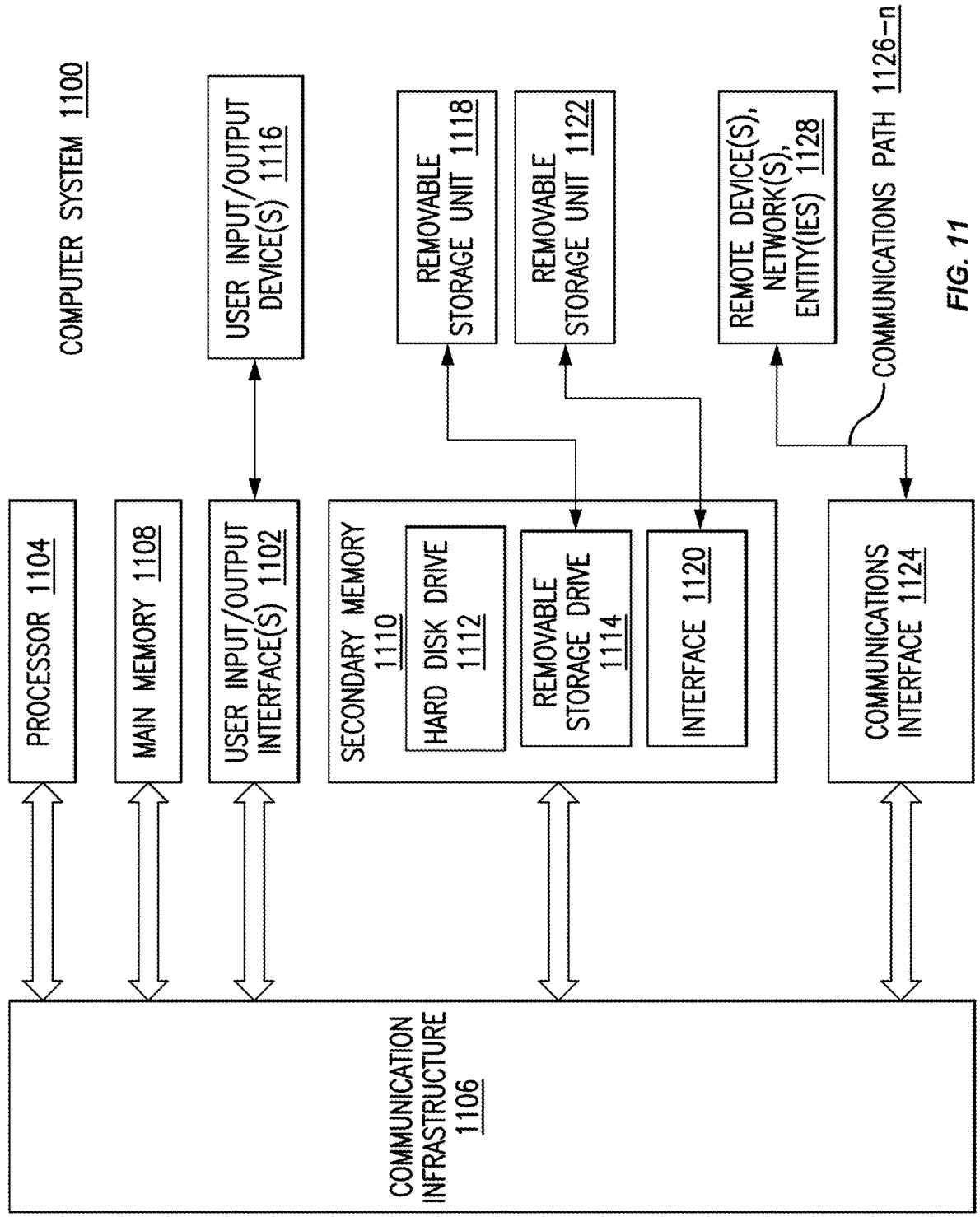
FIG. 11 is a block diagram of an example computer system useful for implementing various aspects.

Various aspects can be implemented, for example, using one or more computer systems, such as computer system 1100 shown in FIG. 11. Computer system 1100 can be used, for example, to implement a system for resituating virtual cameras and avatars in a virtual environment. For example, computer system 1100 can render a three-dimensional virtual environment, position and resituate virtual cameras, and generate and resituate perceived avatars corresponding to user avatars. Computer system 1100 can be any computer capable of performing the functions described herein.

Computer system 1100 can be any well-known computer capable of performing the functions described herein.

Computer system 1100 includes one or more processors (also called central processing units, or CPUs), such as a processor 1104. Processor 1104 is connected to a communication infrastructure or bus 1106.

One or more processors 1104 may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1116, such as monitors, keyboards, pointing devices, etc., that communicate with communication infrastructure 1106 through user input/output interface(s) 1102.

Computer system 1100 also includes a main or primary memory 1108, such as random access memory (RAM). Main memory 1108 may include one or more levels of cache. Main memory 1108 has stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, a tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/or any other computer data storage device. Removable storage drive 1114 reads from and/or writes to removable storage unit 1118 in a well-known manner.

According to an exemplary aspect, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it would be apparent to persons skilled in the relevant art(s) how to make and use aspects of this disclosure using data processing devices, computer systems and/or computer architectures other than that shown in FIG. 11. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary aspects, but should be defined only in accordance with the following claims and their equivalents.

What is claimed is:

1. A computer implemented method for rendering a volumetric avatar in a three-dimensional (3D) virtual environment, comprising:

receiving configuration settings and a video stream with a background on a first device of a first user, wherein the configuration settings and the video stream are sent from a second device of a second user, wherein the video stream captures the second user and is captured using a camera integrated with the second device, and wherein the configuration settings comprise at least one of a video stream cutoff shape, an avatar opaqueness, a video stream edge smoothness, a background removal preference, and a framerate for background removal; and from a perspective of a virtual camera in the 3D virtual environment corresponding to the first user:

rendering a front surface of an avatar containing the video stream, wherein the rendered front surface excludes the background, comprising:

(a) constructing a volumetric shape around the avatar, wherein the volumetric shape encompasses all the avatar;

(b) from within the volumetric shape around the avatar, calculating a shape of the avatar;

(c) excluding pixels outside of the shape of the avatar;

(d) using the configuration settings, comparing pixels within the shape of the avatar to a color of the background; and (e) altering pixels with same color as the background;

rendering a back surface of the avatar containing a silhouette corresponding to the video stream, wherein the rendered back surface excludes the video stream and the background, comprising:

repeating operations (a)-(e);

replacing pixels that are a different color from the background with a solid color; and calculating an intersection between the back surface and the front surface of the avatar;

rendering a side surface of the avatar, comprising:

applying a thickness to the avatar;

sampling at least one pixel within the thickness;

projecting a point corresponding to the at least one pixel onto the front surface of the avatar;

repeating operations (a)-(e); and replacing pixels that are a different color from the background with the solid color, based on the intersection between the back surface and the front surface of the avatar, wherein the side surface is rendered as an uncharacteristic geometric shape.

2. The computer implemented method of claim 1, wherein the volumetric shape is a cylinder.

3. The computer implemented method of claim 1, wherein (e) altering pixels comprises removing pixels.

4. The computer implemented method of claim 1, wherein (e) altering pixels comprises making the pixels transparent.

5. The computer implemented method of claim 1, wherein rendering the front surface only occurs when the perspective of the virtual camera faces a front of the avatar.

6. The computer implemented method of claim 1, wherein rendering the back surface only occurs when the perspective of the virtual camera faces a back of the avatar.

7. The computer implemented method of claim 1, wherein rendering the side surface only occurs when the perspective of the virtual camera faces a side of the avatar.

8. The computer implemented method of claim 1, wherein replacing pixels for the side surface further comprises patterning the solid color.

9. A system for rendering a volumetric avatar in a three-dimensional (3D) virtual environment, comprising:
a computing device, comprising:
a processor; and
a memory, wherein the memory contains instructions stored thereon that when executed by the processor cause the computing device to:
receive configuration settings and a video stream with a background on a first device of a first user, wherein the configuration settings and the video stream are sent from a second device of a second user, wherein the video stream captures the second user and is captured using a camera integrated with the second device, and wherein the configuration settings comprise at least one of a video stream cutoff shape, an avatar opaqueness, a video stream edge smoothness, a background removal preference, and a framerate for background removal; and
from a perspective of a virtual camera in the 3D virtual environment corresponding to the first user:
render a front surface of an avatar containing the video stream, wherein the rendered front surface excludes the background, comprising:
(a) construct a volumetric shape around the avatar, wherein the volumetric shape encompasses all the avatar;
(b) from within the volumetric shape around the avatar, calculate a shape of the avatar;
(c) exclude pixels outside of the shape of the avatar;
(d) using the configuration settings, compare pixels within the shape of the avatar to a color of the background; and
(e) alter pixels with same color as the background;
render a back surface of the avatar containing a silhouette corresponding to the video stream, wherein the rendered back surface excludes the video stream and the background, comprising:
repeat operations (a)-(e);
replace pixels that are a different color from the background with a solid color; and
calculate an intersection between the back surface and the front surface of the avatar;
render a side surface of the avatar, comprising:
apply a thickness to the avatar;
sample at least one pixel within the thickness;
project a point corresponding to the at least one pixel onto the front surface of the avatar;
repeat operations (a)-(e); and
replace pixels that are a different color from the background with the solid color, based on the intersection between the back surface and the front surface of the avatar, wherein the side surface is rendered as an uncharacteristic geometric shape.

10. The system of claim 9, wherein the volumetric shape is a cylinder.

11. The system of claim 9, wherein (e) altering pixels comprises removing pixels.

12. The system of claim 9, wherein (e) altering pixels comprises making the pixels transparent.

13. The system of claim 9, wherein rendering the front surface only occurs when the perspective of the virtual camera faces a front of the avatar.

14. The system of claim 9, wherein rendering the back surface only occurs when the perspective of the virtual camera faces a back of the avatar.

15. The system of claim 9, wherein rendering the side surface only occurs when the perspective of the virtual camera faces a side of the avatar.

16. The system of claim 9, wherein replacing pixels for the side surface further comprises patterning the solid color.

17. A non-transitory computer-readable medium having instructions stored thereon that, when executed by at least one computing device, cause the at least one computing device to perform operations comprising:
receiving configuration settings and a video stream with a background on a first device of a first user, wherein the configuration settings and the video stream are sent from a second device of a second user, wherein the video stream captures the second user and is captured using a camera integrated with the second device, and wherein the configuration settings comprise at least one of a video stream cutoff shape, an avatar opaqueness, a video stream edge smoothness, a background removal preference, and a framerate for background removal; and
from a perspective of a virtual camera in the 3D virtual environment corresponding to the first user:
rendering a front surface of an avatar containing the video stream, wherein the rendered front surface excludes the background, comprising:
(a) constructing a volumetric shape around the avatar, wherein the volumetric shape encompasses all the avatar;
(b) from within the volumetric shape around the avatar, calculating a shape of the avatar;
(c) excluding pixels outside of the shape of the avatar;
(d) using the configuration settings, comparing pixels within the shape of the avatar to a color of the background; and
(e) altering pixels with same color as the background;
rendering a back surface of the avatar containing a silhouette corresponding to the video stream, wherein the rendered back surface excludes the video stream and the background, comprising:
repeating operations (a)-(e);
replacing pixels that are a different color from the background with a solid color; and
calculating an intersection between the back surface and the front surface of the avatar;
rendering a side surface of the avatar, comprising:
applying a thickness to the avatar;
sampling at least one pixel within the thickness;

projecting a point corresponding to the at least one pixel onto the front surface of the avatar;

repeating operations (a)-(e); and replacing pixels that are a different color from the background with the solid color, based on the intersection between the back surface and the front surface of the avatar, wherein the side surface is rendered as an uncharacteristic geometric shape.

18. The non-transitory computer-readable medium of claim 17, wherein the volumetric shape is a cylinder.

19. The non-transitory computer-readable medium of claim 17, wherein (e) altering pixels comprises removing pixels.

20. The non-transitory computer-readable medium of claim 17, wherein (e) altering pixels comprises making the pixels transparent.

* * * * *